United States Patent
Tanaka et al.

(10) Patent No.: US 8,149,453 B2
(45) Date of Patent: Apr. 3, 2012

(54) PRINT DATA-EDITING APPARATUS AND PRINT DATA-EDITING PROGRAM STORED IN COMPUTER READABLE MEDIUM

(75) Inventors: Motonori Tanaka, Nagoya (JP); Tatsuhiro Ikedo, Ena (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1247 days.

(21) Appl. No.: 11/657,811

(22) Filed: Jan. 25, 2007

(65) Prior Publication Data

US 2007/0177201 A1    Aug. 2, 2007

(30) Foreign Application Priority Data

Feb. 1, 2006 (JP) ................................ 2006-024226

(51) Int. Cl.
*G06K 15/02* (2006.01)

(52) U.S. Cl. ....... 358/1.2; 358/1.15; 358/1.18; 715/273; 715/274; 347/106

(58) Field of Classification Search .................. 358/1.2, 358/1.12, 1.15, 1.13, 1.18; 715/243, 274; 347/106

See application file for complete search history.

(56) References Cited

U.S. PATENT DOCUMENTS

| | | | |
|---|---|---|---|
| 6,442,555 B1 * | 8/2002 | Shmueli et al. | 1/1 |
| 7,303,343 B2 | 12/2007 | Kajihara et al. | |
| 7,366,980 B2 * | 4/2008 | Small | 715/248 |
| 7,724,384 B2 * | 5/2010 | Hwang et al. | 358/1.13 |
| 7,847,969 B2 * | 12/2010 | Iwanaga et al. | 358/1.18 |
| 2001/0040684 A1 * | 11/2001 | Takahashi | 358/1.2 |
| 2002/0122199 A1 * | 9/2002 | Lomas et al. | 358/1.14 |
| 2003/0147097 A1 * | 8/2003 | Kotani et al. | 358/1.18 |
| 2004/0210832 A1 | 10/2004 | Iwanaga et al. | |
| 2005/0073715 A1 | 4/2005 | Sakai et al. | |
| 2005/0235196 A1 | 10/2005 | Iwanaga et al. | |

FOREIGN PATENT DOCUMENTS

| | | |
|---|---|---|
| EP | 1582365 | 10/2005 |
| EP | 1582365 A1 * | 10/2005 |
| GB | 2 326 498 | 12/1998 |
| JP | 2000010905 | 1/2000 |
| JP | 2001326766 | 11/2001 |
| JP | 2003266839 | 9/2003 |
| JP | 2003266876 | 9/2003 |
| JP | 2005092334 | 4/2005 |
| JP | 2005092397 | 4/2005 |
| JP | 2005196261 | 7/2005 |
| JP | 2005284940 | 10/2005 |
| WO | 03021475 | 3/2003 |

* cited by examiner

*Primary Examiner* — Twyler Haskins
*Assistant Examiner* — Dennis Dicker
(74) *Attorney, Agent, or Firm* — Day Pitney LLP

(57) ABSTRACT

When a printing apparatus is connected to a personal computer, an editing program for editing an object to be printed by the printing apparatus is actuated. The printing apparatus connected is set as a printing apparatus to be used, and a layout-editing screen is displayed. A layout image in which a medium set in the printing apparatus is set as a medium to be used is displayed on the layout-editing screen. When the printing apparatus is changed, or the medium set in the printing apparatus is changed while the editing program is being operated, a new layout-editing screen is displayed in which a new printing apparatus, or a new medium, is set as the printing apparatus, or the medium, to be used.

6 Claims, 13 Drawing Sheets

PRINT DATA-EDITING APPARATUS AND PRINT DATA-EDITING PROGRAM STORED IN COMPUTER READABLE MEDIUM

This application claims priority from JP 2006-024226, filed Feb. 1, 2006, the entire disclosure of which is incorporated herein by reference thereto.

BACKGROUND

1. Field of the Invention

The disclosure relates to a print data-editing apparatus and a print data-editing program stored in computer readable medium, and more specifically to a print data-editing apparatus and a print data-editing program in which the burden of tasks required to be performed for purposes of printing print data can be reduced.

2. Description of the Related Art

Conventionally, when any information is printed by means of a printing apparatus, printing is mainly executed by means of the following operations:

1. actuating an application for editing;
2. newly creating a task window on which a layout image for editing an object to be printed can be displayed;
3. selecting a printing apparatus;
4. selecting a print medium;
5. editing an object;
6. connecting the printing apparatus; and
7. executing the printing.

For example, Japanese Patent Application Laid-Open No. 2000-10905 proposes an information processing-apparatus in which, when a device is connected to a serial port, or to an USB port, a program corresponding to the device is actuated. When such an information-processing apparatus is used, information can be printed by means of the following operations:

1. actuating an application for connection, for editing by means of the printing apparatus;
2. newly creating a task window on which a layout image for editing an object to be printed can be displayed;
3. selecting a printing apparatus;
4. selecting a print medium;
5. editing an object; and
6. executing the printing

SUMMARY OF THE INVENTION

However, in a conventional operation, and even according to a procedure followed at a time when the information processing apparatus disclosed in Japanese Patent Application Laid-Open No. 2000-10905 is used, steps 2 to 4 (creating a new layout image, selecting a printing apparatus and selecting a print medium) need to be executed, and thus, although each individual step involved takes only a short time all the steps need to be undertaken, and the burden of performing such tasks has been considerable. Furthermore, an additional problem has been that when after step 2 (creating a new layout image) has been executed, step 5 (editing an object) has had to be executed by use of a printing apparatus and a print medium that have been initially selected by defaults without steps 3 and 4 (selecting a printing apparatus and selecting a print medium) having been executed. Objects which are edited can be thereby wasted because selections initially made by default can be different from the printing apparatus and the print medium which are actually used.

The disclosure has been devised to solve the above problem, and its object is to provide a print data-editing apparatus and a print data-editing program stored in a computer readable medium in which the burden required to be performed for purposes of tasks of printing print data can be reduced.

In order to solve the above problem, in a first aspect, a print data-editing apparatus, includes: a printing apparatus that executes printing; a connecting device that connects the printing apparatus; a connection-detecting device that detects whether the printing apparatus has been connected to the connecting device; a printing apparatus type acquiring device that acquires from the printing apparatus a type of printing apparatus connected to the connecting device; a display device that displays information; a layout image display device that displays on the display device a layout image. In which an object to be printed is arranged on an image of a print medium; and a new layout image-creating device that, when the connection-detecting device has detected that the printing apparatus has been connected to the connecting device, newly displays on the layout image display device a layout image of the print medium that is printable in the printing apparatus of the type acquired by the printing apparatus type-acquiring device.

According to a second aspect, a print data-editing apparatus, includes: a printing apparatus that executes printing; a connecting device that connects the printing apparatus; a display device that displays information; a layout image display device that displays on the display device a layout image in which an object to be printed is arranged on an image of a print medium; and a control device that detects whether the printing apparatus has been connected to the connecting device, acquires from the printing apparatus a type of printing apparatus connected to the connecting device, and after detecting that the printing apparatus has been connected to the connecting device, newly displays on the layout image display device a layout image of the print medium that is printable in the printing apparatus of the type acquired.

According to a third aspect, a print data-editing program stored in a computer readable medium that is readable by a computer, includes: a connection detecting step of detecting a connection of a printing apparatus; a printing apparatus type-acquiring step of acquiring from the printing apparatus a type of printing apparatus connected; a layout image display step of displaying a layout image in which an object to be printed is arranged on an image of a print medium; and a new layout image creating step of, after a connection of the printing apparatus has been detected at the time of the connection-detecting step, newly displaying a layout image of a print medium printable in the printing apparatus of the type acquired at the time of the printing apparatus type-acquiring step.

BRIEF DESCRIPTION OF THE DRAWINGS

Exemplary embodiments of the disclosure will be described in detail below with reference to the accompanying drawings in which.

DETAILED DESCRIPTION OF THE
EXEMPLARY EMBODIMENT

A preferred embodiment will be explained below with reference to the drawings. A personal computer 2 connected to a printing apparatus 1 will be explained. A "connecting program" and an "editing program", which combine to constitute a "print data-editing program" are installed into the personal computer 2. In the personal computer 2 of this embodiment, when the printing apparatus 1 is newly connected, a layout-editing screen is displayed (see FIG. 6) on which a medium set in the newly connected printing apparatus 1 is a set sheet. When the medium (print medium) set in the printing apparatus 1 is changed, a layout-editing screen is displayed (see FIG. 7) on which a newly set medium is a set sheet.

Figure 2:
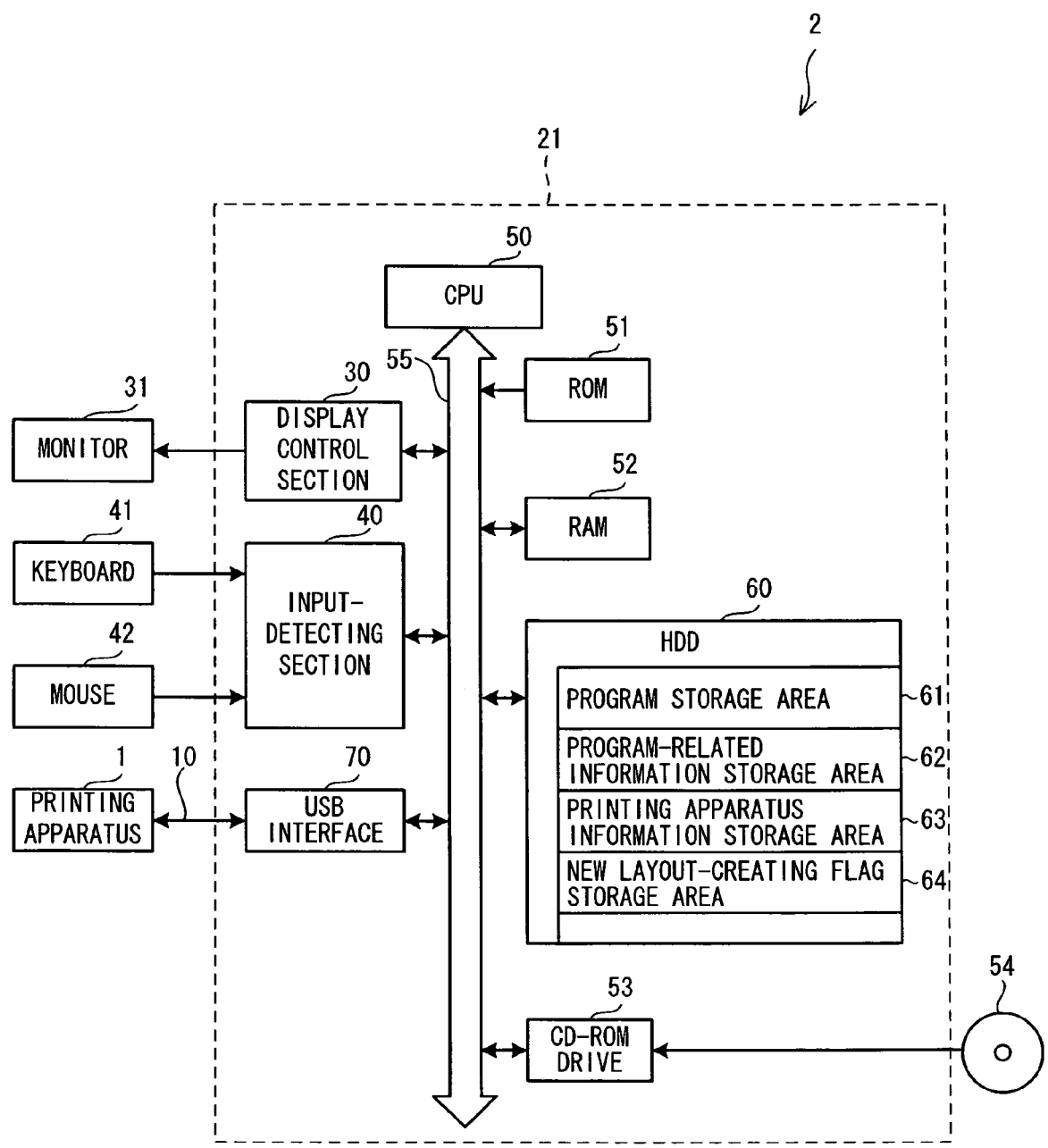
FIG. 2 is a block diagram illustrating an electrical constitution of a personal computer.
Figure 3:
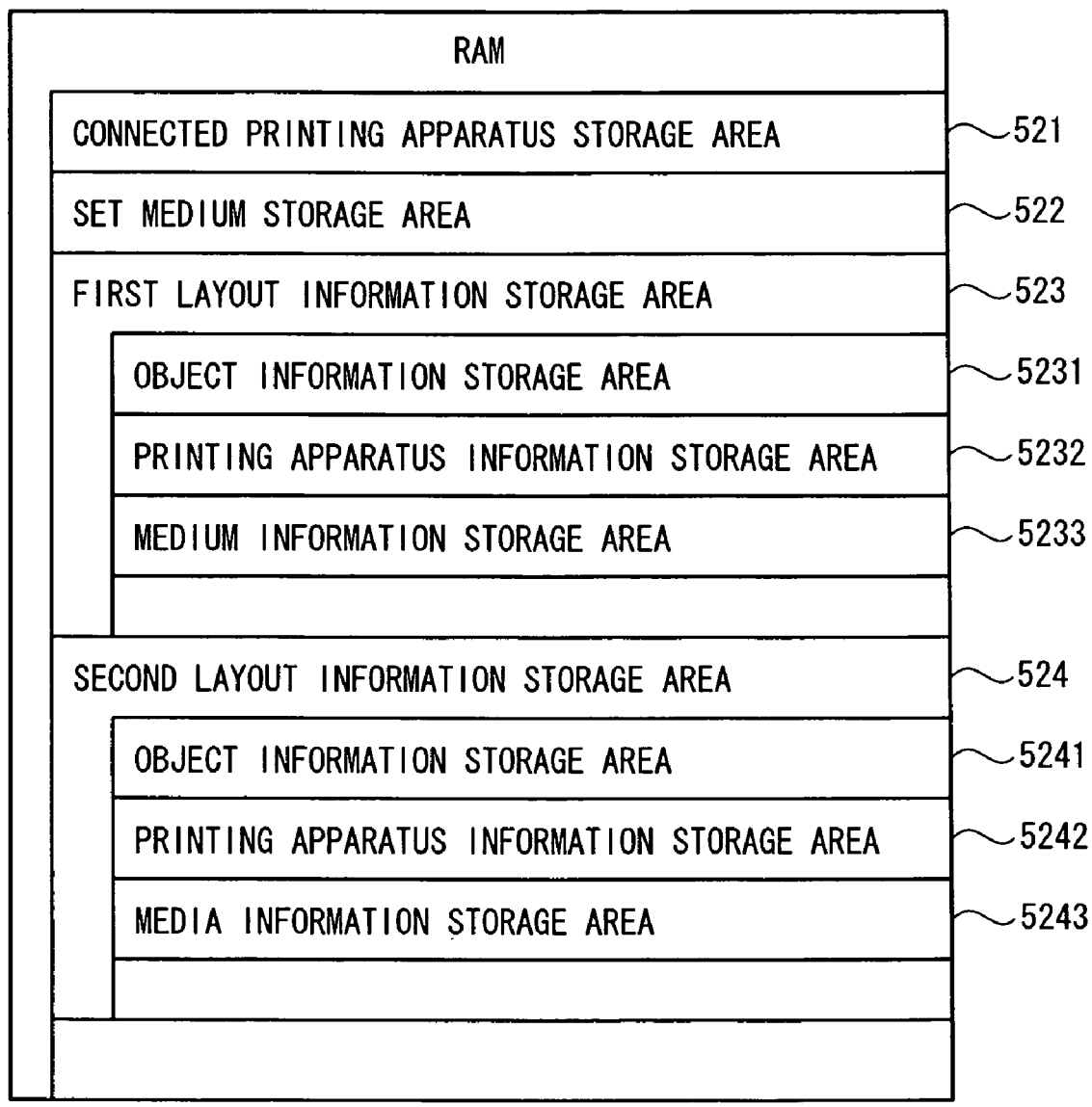
FIG. 3 is a pattern diagram illustrating a constitution of a RAM.

The printing apparatus 1 and the personal computer 2 will first be explained with reference to FIGS. 1 to 3.

Figure 1:
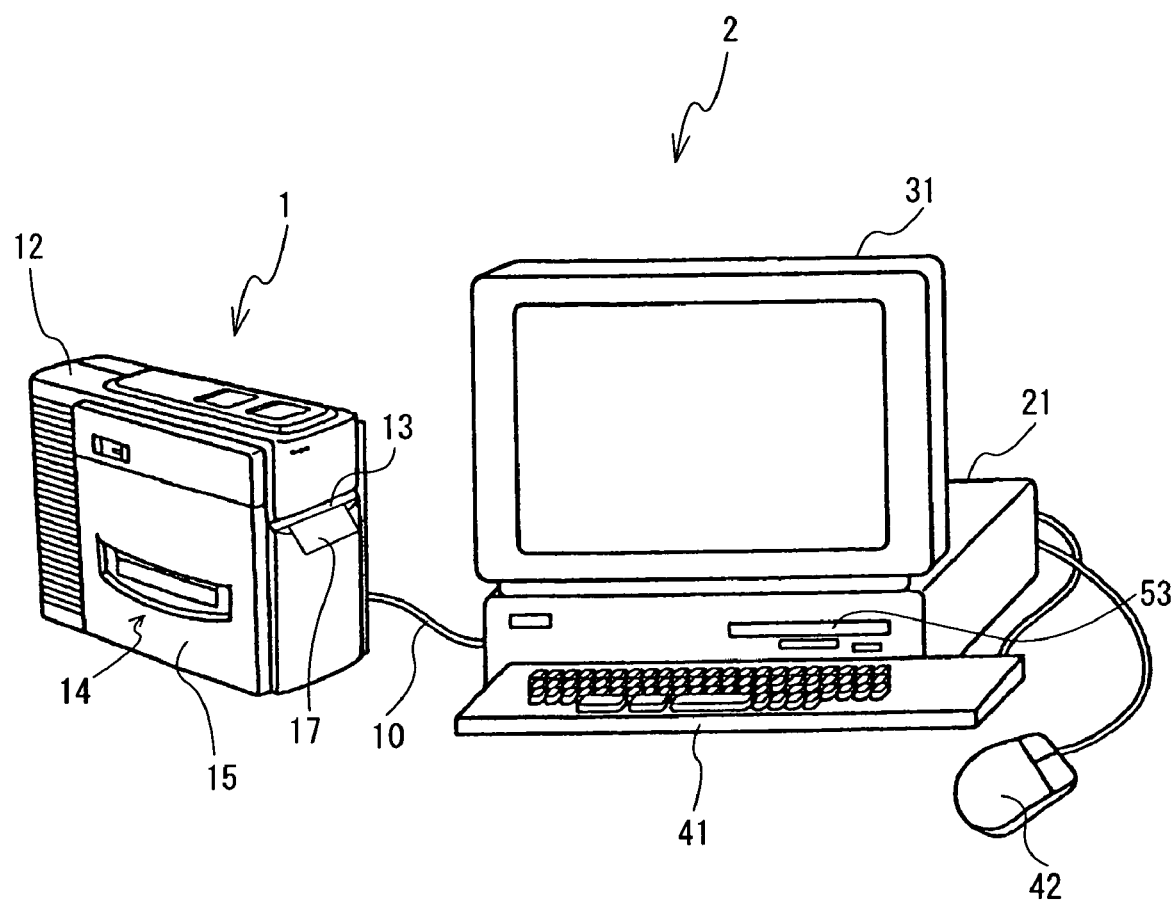
FIG. 1 is a perspective external view illustrating outlines of a printing apparatus and a personal computer.

As illustrated in FIG. 1, the personal computer 2 is connected to the printing apparatus 1 by means of an USB cable 10 on the basis of, for example, the USB standard. The personal computer 2 and the printing apparatus 1 transmit and receive data by way of the USB cable 10. The computer 2 is a well-known personal computer, and as illustrated in FIG. 1, has a main body 21 having a CPU 50 or the like (see FIG. 2), a monitor 31, a keyboard 41 and a mouse 42. The monitor 31, the keyboard 41 and the mouse 42 are connected to the main body 21 by means of a connecting cable. The personal computer 2 creates print data on the basis of image data created by an application into which the editing program is incorporated, and transmits to the printing apparatus 1 the print data that is thereby created.

As illustrated in FIG. 1, the printing apparatus 1 is cased by an approximately rectangular parallelepiped enclosure 12. A front surface of the enclosure 12 (the surface in a right-front direction in FIG. 1) is provided with a discharge port 13 for discharging a tape 17. Further, an inside of a left surface of the enclosure 12 is provided with a tape cassette-storing section 14, and a cover 15 provided on a left surface of the enclosure 12 is opened, so that a tape cassette can be attached detachably. The tape cassette storing section 14 is provided with a printing mechanism that allows the tape 17 to run between a thermal head having a plurality of heater elements and a platen roller which comes in contact with the thermal head and carries out printing on the tape 17. The printing mechanism carries out printing on the tape 17 of the attached tape cassette, and the tape 17 is cut by a tape cutter of the printing mechanism so as to be discharged from the discharge port 13. The printing apparatus 1 that is connected to the personal computer 2 need not be limited to a tape printer having such a shape, and may be a tape printer having another shape, an ink-jet printer, a laser printer or a dot printer. In this embodiment, two kinds of tape printers: a tape printer having model code "PT-2700" and a tape printer having a model code "PT-9500PC", are used as the printing apparatus 1.

An electrical constitution of the personal computer 2 will be explained below with reference to FIG. 2. As shown in FIG. 2, the personal computer 2 is provided with a CPU 50 that controls the personal computer 2. The CPU 50 is connected to a ROM 51, a RAM 52, a CD-ROM drive 53 and an HDD 60 via a bus 55. The ROM 51 stores therein programs such as a basic input and output system (BIOS) executed by the CPU 50. The RAM 52 temporarily stores data therein. A CD-ROM 54, as a data storage medium, is inserted into the CD-ROM drive 53, and the CD-ROM drive 53 reads the data. The HDD 60 is a data storage device.

The HDD 60 is provided with facilities such as a program storage area 61, a program-related information storage area 62, a printing apparatus information storage area 63 and a new layout-creating program storage area 64. Various programs, including a connecting program and an editing program which are executed by the personal computer 2, are stored in the program storage area 61. Information such as setting, initial values and data necessary for executing the programs are stored in the program-related information storage area 62. Information about the printing apparatus 1 is stored in the printing apparatus information storage area 63. A new layout-creating flag is stored in the new layout-creating flag storage area 64.

An USB interface 70, a display control section 30 and an input-detecting section 40 are connected to the CPU 50 via the bus 55. The USB interface 70 is for purposes of communicating with external devices including the printing apparatus 1. The display control section 30 executes a screen display process on the monitor 31 for displaying an operating screen to a user. The input-detecting section 40 is connected to the keyboard 41 and the mouse 42 with which the user performs input operations, and detects the input operations. The personal computer 2 may also be provided with items such as a flexible disc drive, an audio input/output section and various interfaces, all of which are not illustrated.

Items such as the software into which the connecting program and the editing program are incorporated, the setting and the data that is used at the time that the programs are executed are stored in the CD-ROM 54. When the programs and the data have been introduced, they are stored from the CD-ROM 54 into the program storage area 61 and into the program-related information storage area 62 provided in the HDD 60. The method of acquiring the print data-editing program, and items such as the data in the personal computer 2 to be used need not be limited to a method in which the CD-ROM 54 is used, and another recording medium such as a flexible disc, or a magneto optical disc (an MO disc) may be used, or, alternatively, the personal computer 2 may be connected to a network so that the programs and the data can be acquired from another terminal on the network.

Next, storage areas provided in the RAM 52 will be explained below with reference to FIG. 3. The RAM 52 is provided with a connected printing apparatus storage area 521, into which the model of the printing apparatus 1 connected to the USB interface 70 is stored, and with a set medium storage area 522. Further, a layout information storage area is provided for each layout to be edited on a layout-editing screen (see FIGS. 4 to 7). In the example shown in FIG. 3, a first layout information storage area 523 and a second layout information storage area 524 are shown, and other information will accordingly be omitted. Object information storage areas 5231 and 5241, into which information about objects arranged on the layouts is stored are respectively provided in the layout information storage areas 523 and 524. Further, printing apparatus information storage areas 5232 and 5242, into which information about a printing apparatus for printing the layout is stored, and areas such as medium information storage areas 5233 and 5243, into which the setting of a sheet (medium) where an object is arranged, is stored, are respectively provided in the layout information storage areas 523 and 524. Furthermore, a type of object, such as characters and image, an object size, an attribute according to the object type (if characters, a type of font and a character size) are all stored in the object information storage areas 5231 and 5241. Model information which stipulates the model of printing apparatus for purposes of printing the object is stored in the printing apparatus information storage areas 5232 and 5242. A type of medium for storing a type of medium therein, and factors such as the direction of arrangement are stored in the medium information storage areas 5233 and 5243. Further, in this embodiment, when the medium is a cut sheet, a state in which the longitudinal direction is set in an up-down direction is a "vertical" medium direction, and a state in which the longitudinal direction of the medium is set in a right-left direction is a "lateral" medium direction. When the medium is a continuous sheet or a tape, the continuous direction of the medium is set as a lateral direction, and thus the medium direction is set as "lateral".

An editor 100 that is actuated by the personal computer 2 will next be explained below with reference to FIGS. 4 to 7. The editor 100 is displayed on the monitor 31 of the personal computer 2 by means of an operation of the print data-editing program, and data are input, or an instruction is given, by means of an operation in which the keyboard 41, or the mouse 42, is used.

Figure 4:
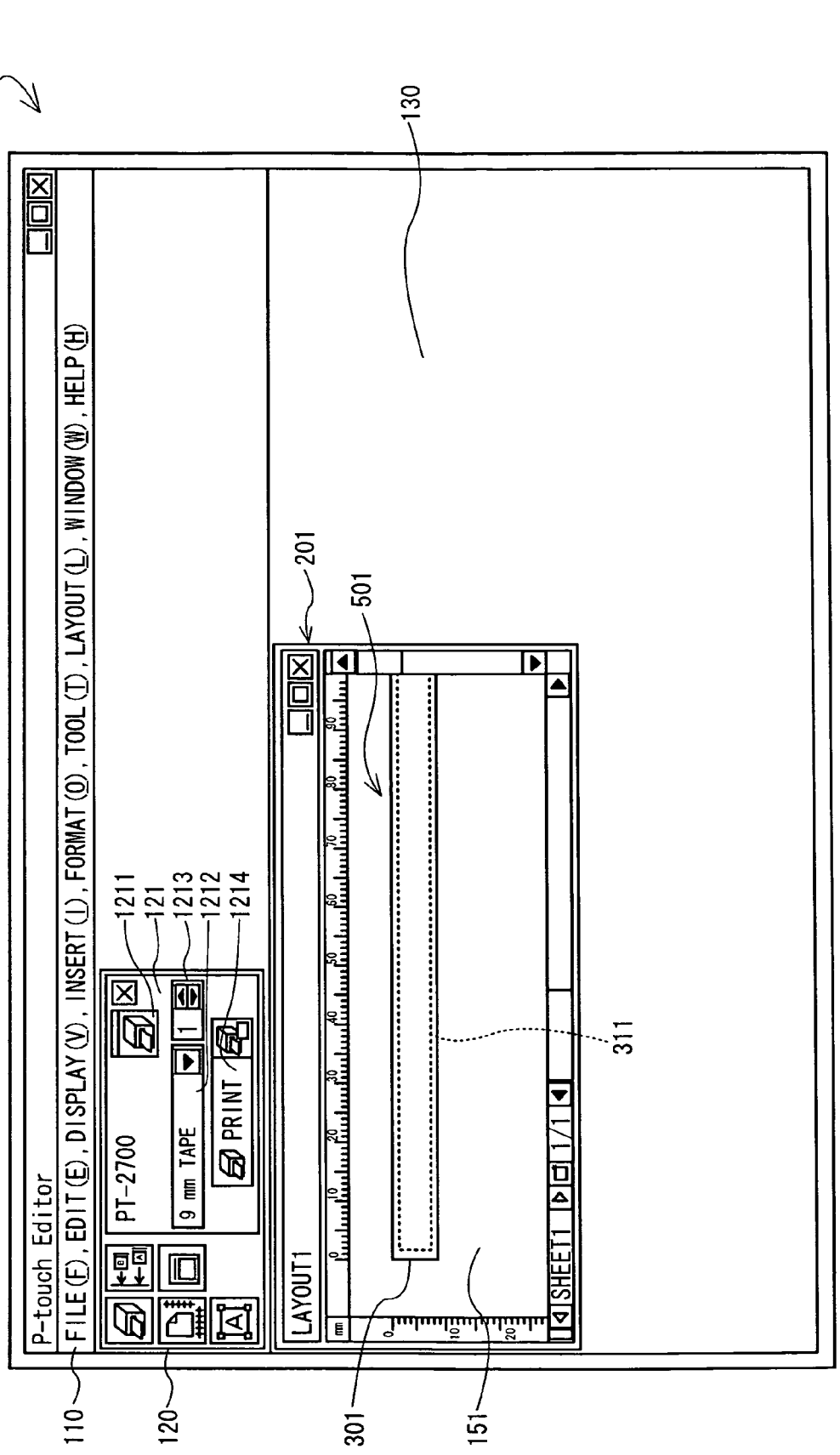
FIG. 4 is an image diagram of an editor on which a layout-editing screen of "layout 1" is displayed when a printing apparatus "PT-2700" has been connected.

First, the editor 100, on which a layout-editing screen 201 of "layout 1" is displayed at a time when the printing apparatus 1 "PT-2700" has been connected and the editing program has been automatically actuated, will be explained with reference to FIG. 4. As illustrated in FIG. 4, an upper portion of the editor 100 is provided with a menu bar 110 and a tool bar 120 for instructing an operation, and a lower half portion of the editor 100 is provided with a display area 130 on which a layout-editing screen 201 is displayed for editing items such as characters that are to be printed by the printing apparatus 1. A plurality of layout-editing screens can be displayed in the display area 130, but in the example shown in FIG. 4, one of the layout-editing screens 201 is displayed. The layout-editing screen 201 is provided with a task area 151, and as an image of a set sheet a sheet image 301 is displayed thereon. A dotted line 311 displayed on the sheet image 301 indicates a printable area, inside the dotted line 311 is a printable area, and the outside thereof is a blank space.

When this kind of editor 100 is operated by means of the keyboard 41 or the mouse 42, information to be printed by the printing apparatus 1 is edited. For example, when an insertion menu of the menu bar 110 is selected, and "text" is selected from the insertion menu displayed, a text object that displays characters is created, a text object image is displayed on the sheet image 301, and by means of an operation of the keyboard 41 the characters are arranged within the text object image.

Figure 5:
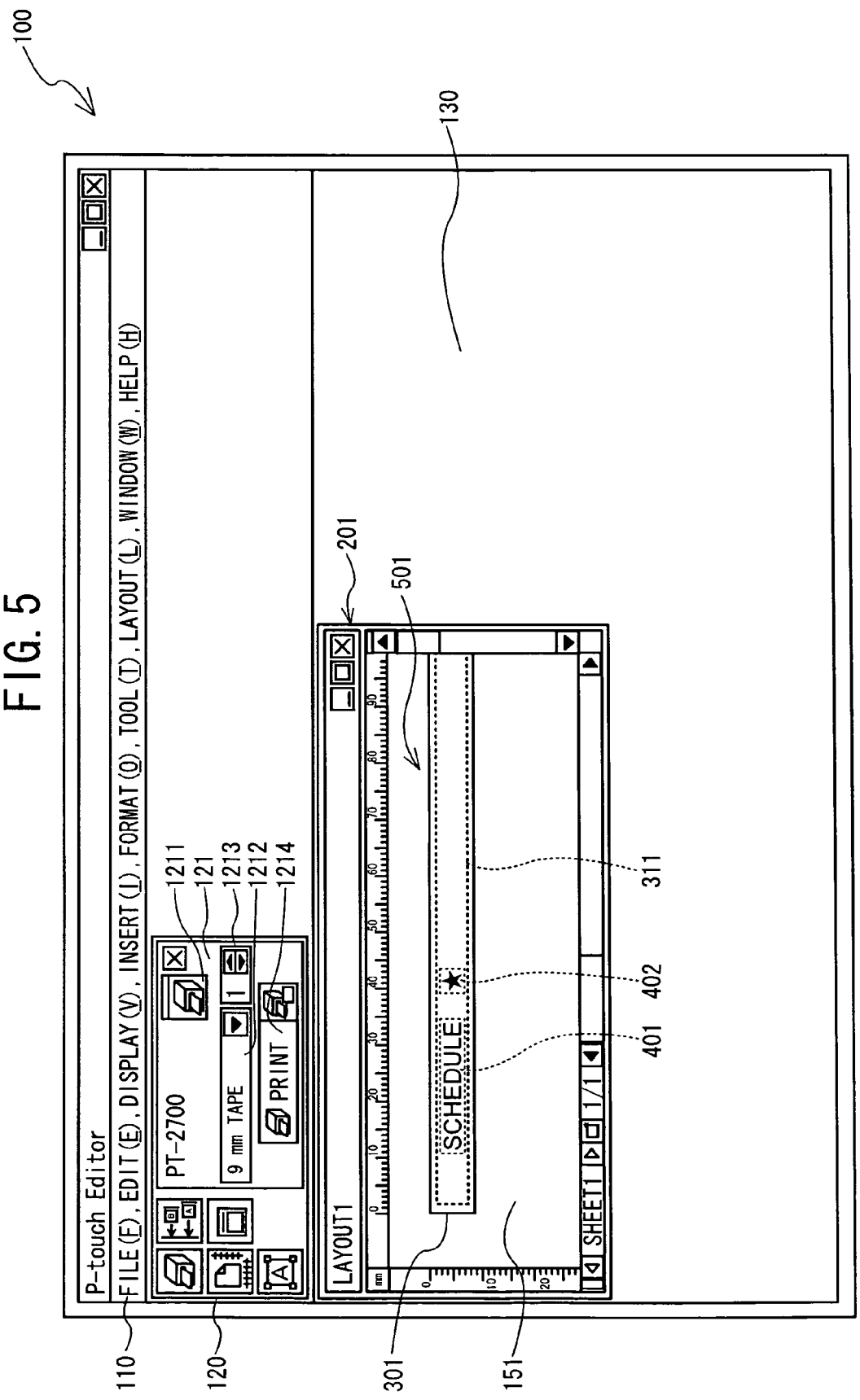
FIG. 5 is an image diagram of an editor on which an object image has been arranged on a layout-editing screen.

As illustrated in FIG. 5, the object to be printed can be arranged on the sheet image 301. In the example illustrated in FIG. 5, a character object image 401 "SCHEDULE", and an image object image 402 of a star pattern, are arranged. In this embodiment, the sheet image and the object image are collectively called a "layout image". In a state in which the object is not arranged, the "layout image" is made up of only the sheet image. In the example illustrated in FIG. 4, only the sheet image 301 makes up the layout image 501, and in the example illustrated in FIG. 5, since the object images 401 and 402 are arranged, the sheet image 301, the character object image 401 and the image object image 402 constitute the layout image 501.

As illustrated in FIGS. 4 and 5, a printing apparatus tool box 121 indicating information of the set printing apparatus is displayed on the tool bar 120. Since FIG. 4 illustrates the editor 100 on which the layout-editing screen 201 is displayed when the printing apparatus 1 "PT-2700" has been connected, the model code "PT-2700" of the printing apparatus 1 is displayed on the printing apparatus tool box 121. A right side of the model code is provided with a printing apparatus property button 1211 for purposes of setting the printing apparatus 1. A lower side of the model code is provided with a medium selection combo box 1212 for purposes of selecting a type of a medium. A right side of the medium selection combo box 1212 is provided with a print copies list box 1213 for specifying numbers of print copies. A lower side of the print copies list box 1213 is provided with a print button 1214 for giving instructions for printing. In the example illustrated in FIG. 4, the printing apparatus 1 "PT-2700" is connected to the personal computer 2 in a state in which a tape with a width of 9 mm is attached to the printing apparatus 1, and a "9 mm tape" is selected in the medium selection combo box 1212.

Figure 6:
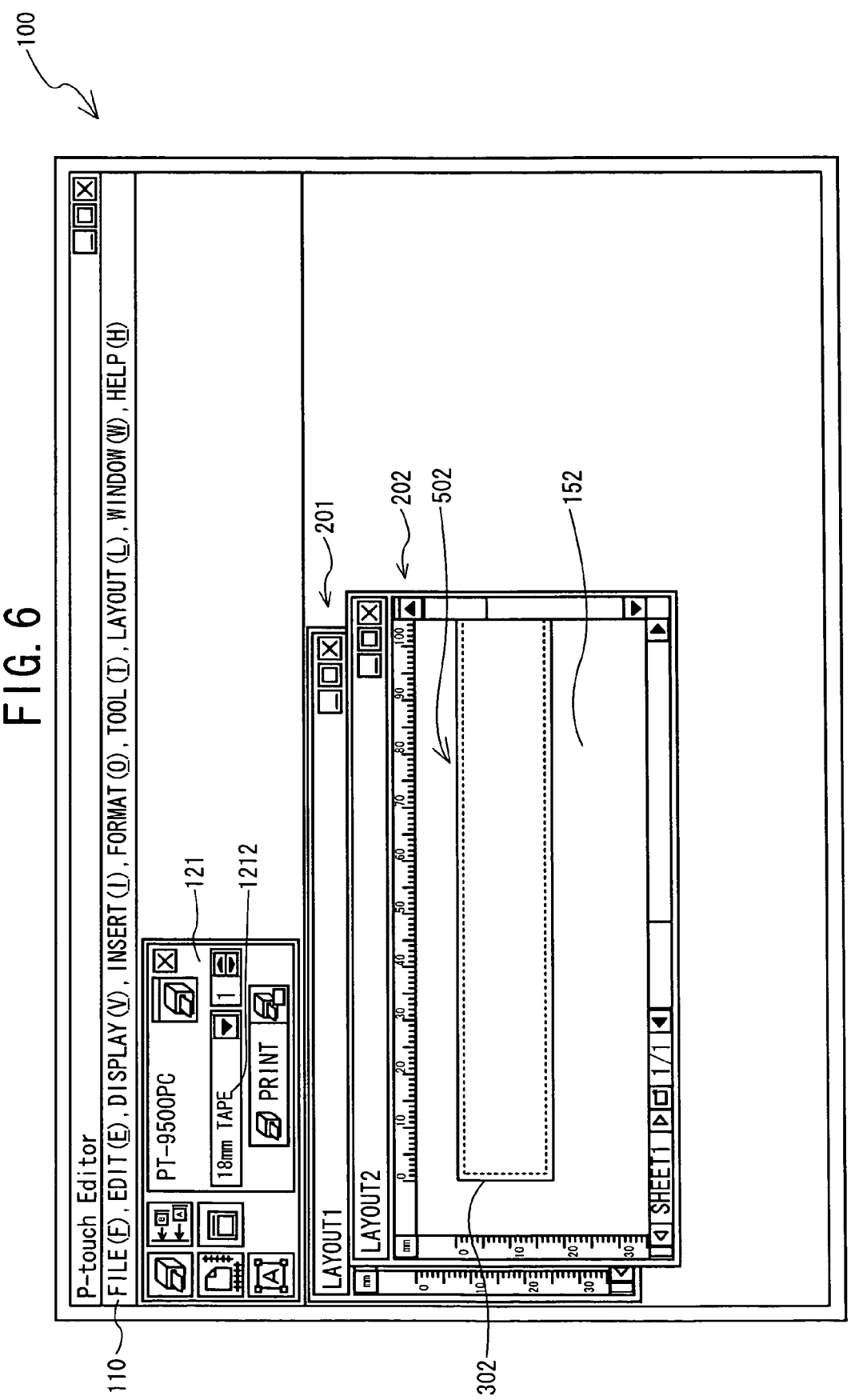
FIG. 6 is an image diagram of an editor on which a layout-editing screen of "layout 2" has been newly displayed at a time when the printing apparatus has been changed from "PT-2700" into "PT-9500PC"

The editor 100, on which a layout-editing screen 202 of "layout 2" is newly displayed at a time when the printing apparatus 1 has been changed from "PT-2700" into "PT-9500PC", will be explained below with reference to FIG. 6. When the printing apparatus 1 has been replaced, the layout-editing screen of the newly connected printing apparatus 1 is displayed. As illustrated in FIG. 6, the layout-editing screen 202 of "layout 2" is displayed on the layout-editing screen 201 of "layout 1". At this time, as illustrated in FIG. 6, the model code "PT-9500PC" of the printing apparatus which is selected on the layout-editing screen 202 is displayed on the printing apparatus tool box 121. A layout image 502 composed of a sheet image 302 of a 18 mm tape, as a medium attached to "PT-9500PC", is displayed on a task area 152 of the layout-editing screen 202. The "18 mm tape" is selected on the medium selection combo box 1212.

When a plurality of layout-editing screens are displayed in the display area 130, the layout-editing screen that has been specified as the selected layout-editing screen is displayed on the front surface. The RAM 52 is provided with a selected screen information storage area, not shown, and the layout information storage area of the RAM 52 is provided with a layout identification information storage area, not shown. Identification codes for identifying layouts are stored as layout identification information, and an identification code for layouts of the selected layout-editing screen is stored in the selected screen information storage area. A user specifies the selected layout-editing screen according to input from the mouse 42, or from the keyboard 41. For example, when a part of the layout-editing screen is clicked by means of the mouse 42, the layout-editing screen is the selected layout-editing screen, and the identification code stored in the layout identification information storage area for the layout information of the layout-editing screen is stored in the selected screen storage area.

Figure 7:
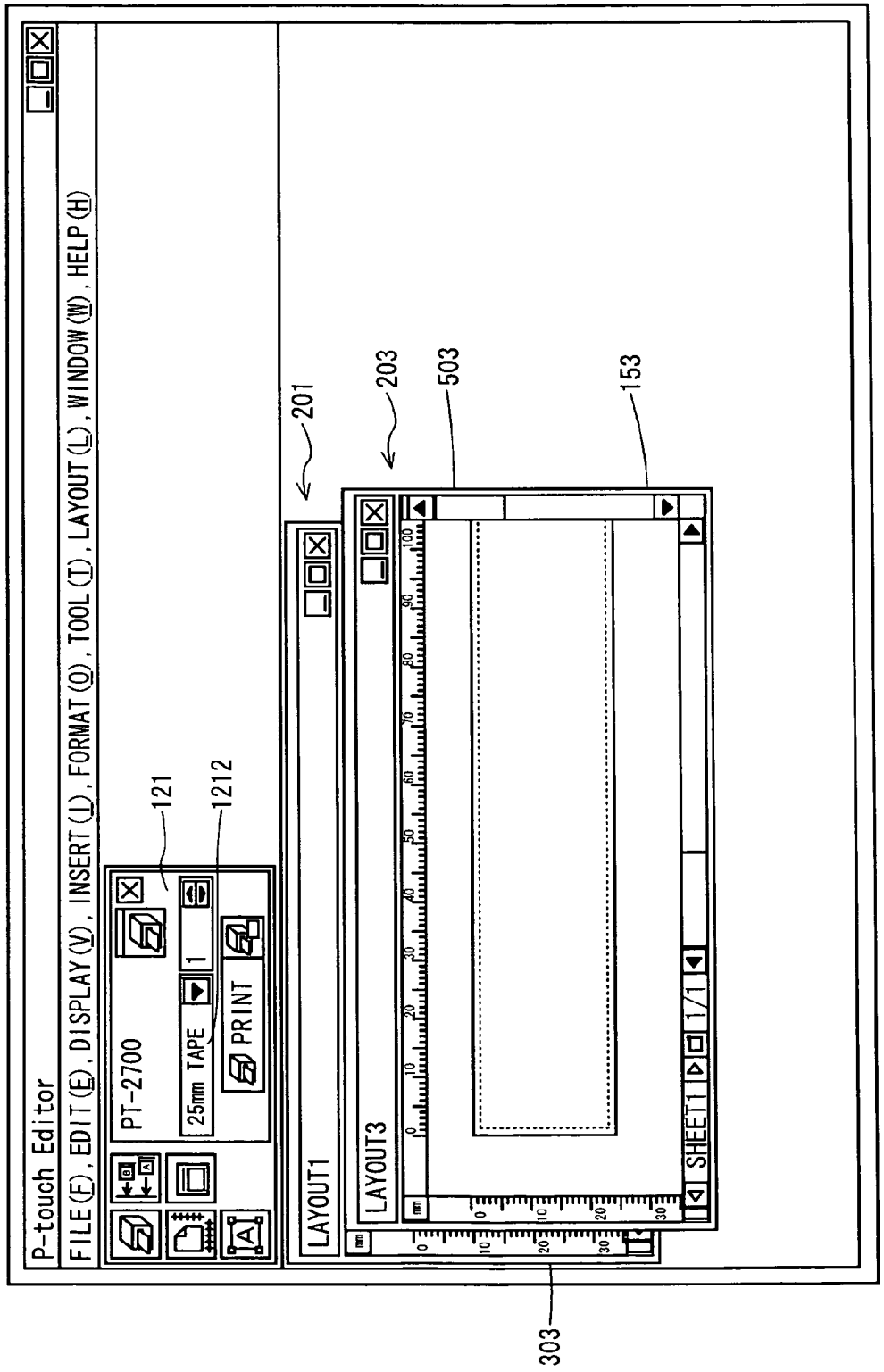
FIG. 7 is an image diagram of an editor where a layout-editing screen of "layout 3" has been newly displayed at a time when a medium has been changed from a standard one into "25 mm"

The editor 100, on which a layout-editing screen 203 of "layout 3" is newly displayed at a time that the medium is changed from a "9 mm tape" to a "25 mm tape" in a state of the editor 100 in which only the "layout 1" illustrated in FIG. 4 or 5 is displayed, will now be explained with reference to FIG. 7. When the medium is changed, the layout-editing screen of the newly set medium is displayed. As illustrated in FIG. 7, the layout-editing screen 203 of "layout 3" is displayed on the layout-editing screen 201 of "layout 1". At this time, as illustrated in FIG. 7, the model code "PT-2700" of the printing apparatus which has been selected on the layout-editing screen 203 is displayed on the printing apparatus tool box 121, and the "25 mm tape" is selected on the medium selection combo box 1212. A layout image 503 composed of a sheet image 303 of the 25 mm tape, as the medium "25 mm tape" of "PT-2700", is displayed in a task area 153 of the layout-editing screen 203.

A new layout-creating flag-setting screen 109 will now be explained with reference to FIG. 8. The new layout-creating flag-setting screen 109 is the main portion of the disclosure that sets whether or not a new layout image needs to be created on the basis of the connection of the printing apparatus 1 and the replacement of a medium. The new layout-creating flag-setting screen 109 is executed by giving instructions for the setting of the new layout creating flag. In this embodiment, a "tool" menu of the menu bar 101 is selected, and the "set the new layout creating flag" is selected from the displayed menu, in such a way that instructions can be given for the setting.

Figure 8:
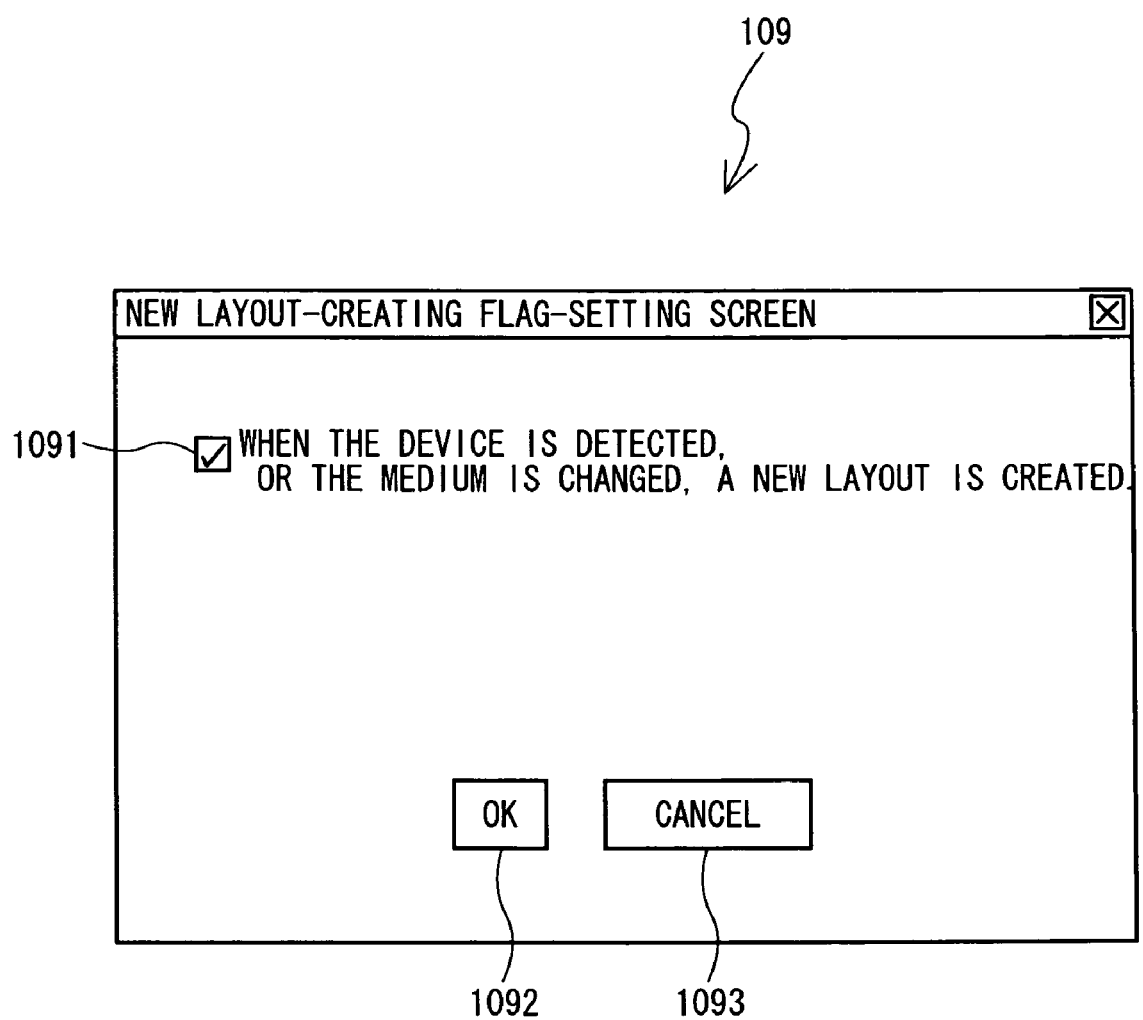
FIG. 8 is an image diagram of a new layout-creating flag-setting screen.

As illustrated in FIG. 8, provided are a check box 1091 on which is annotated "when the device is detected, or the medium is changed, a new layout is created", an OK button 1092 and a cancel button 1093. When the check box 1091 has been checked, and the OK button 1092 has been selected, "1" is stored in the new layout-creating flag storage area 64 of the HDD 60 so that the flag is turned "ON". When the check box 1091 has not been checked and the OK button 1092 has been selected, "0" is stored in the new layout creating flag storage area 64, and the flag is turned "OFF". When the cancel button 1093 has been selected, the state of the new layout creating flag storage area 64 does not change. When the new layout-creating flag is "ON", a new layout image is created as a result of the connection of the printing apparatus 1 and the replacement of a medium, and when the flag is "OFF", even if the printing apparatus 1 has been connected and the medium has been replaced, a new layout image is not created.

Figure 9:
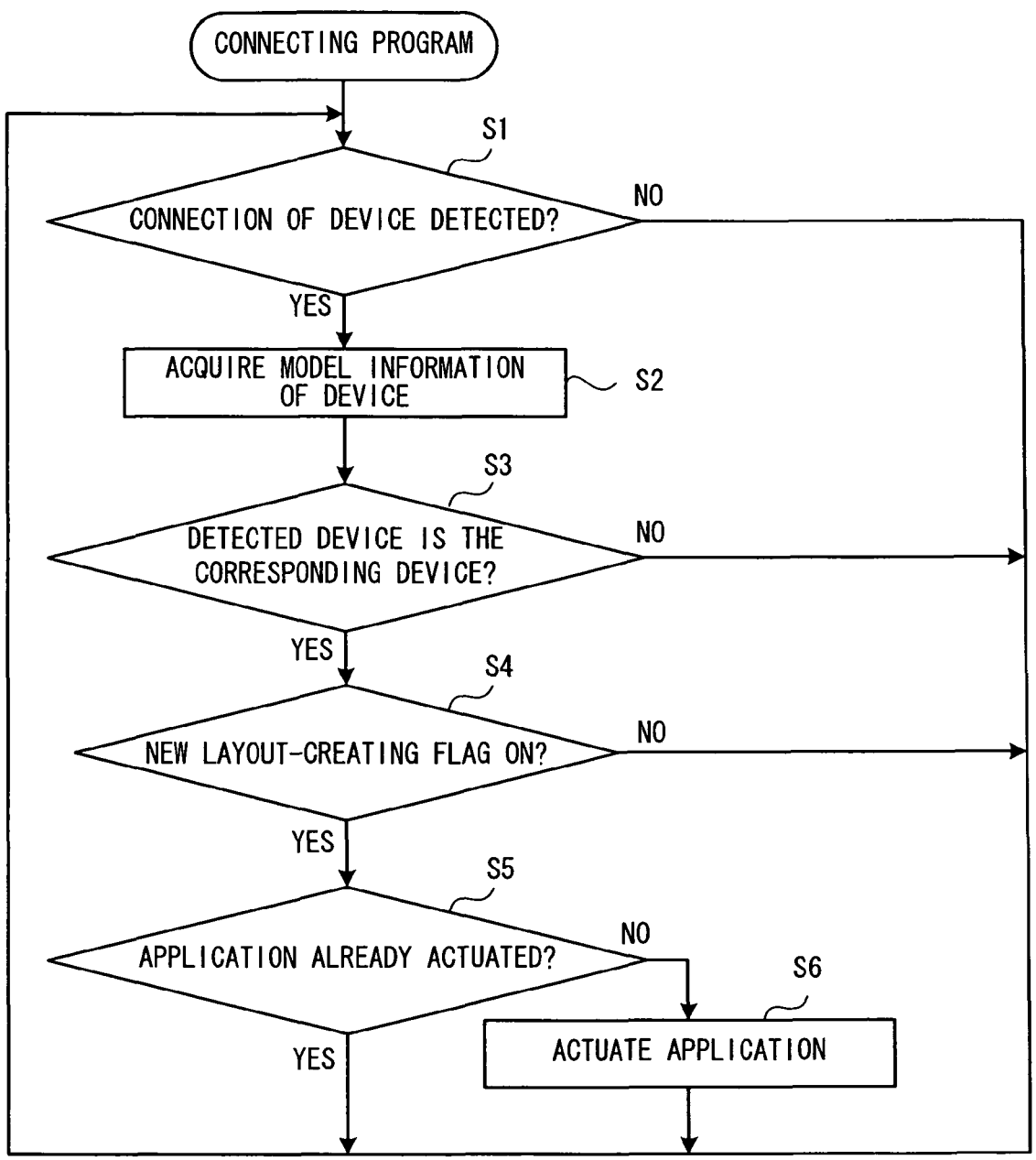
FIG. 9 is a flowchart of a connecting program.
Figure 11:
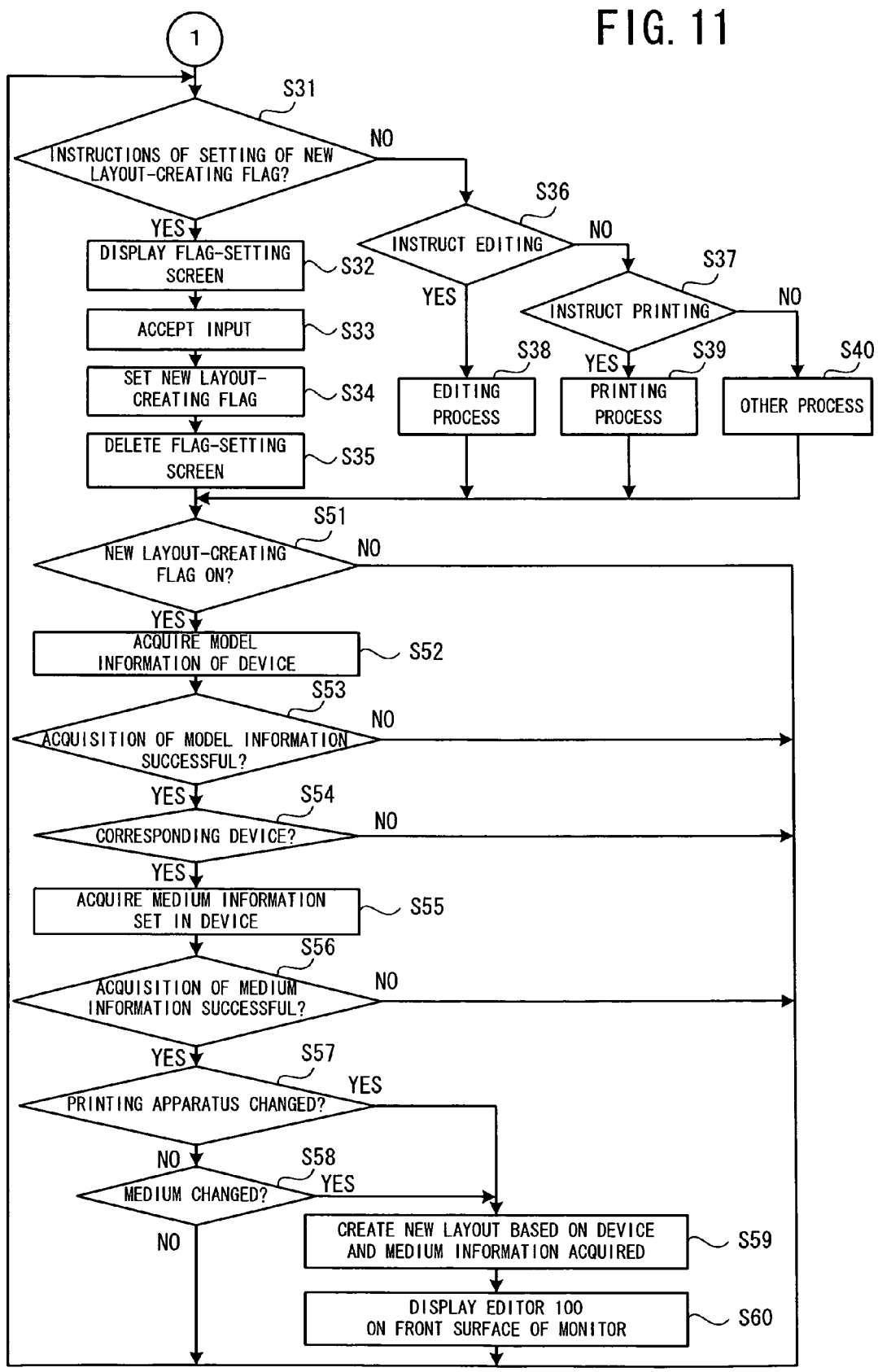
FIG. 11 is the continuation of the flowchart of the editing program.

The main procedures in the connecting program and the editing program to be executed by the personal computer 2 will now be explained with reference to the flowcharts in FIGS. 9 and 11.

The procedure that is executed in the connecting program will be explained with reference to FIG. 9. The connecting program is automatically started when the personal computer 2 has been actuated, and while the personal computer 2 is operating, this program is constantly executed. When the printing apparatus 1 has been connected to the USB interface 70, if the editing program is not being executed, or if the medium of the printing apparatus 1 that is connected is replaced, the editing program will be started.

An inquiry is submitted to the OS (Operating System) of the personal computer 2 as to whether or not the device has been connected to the USB interface 70, and a determination is made whether a connection of the device has been detected (S1). When the device has not been connected to the USB interface 70 (NO at S1), no procedure needs to be executed, and thus the procedure returns to S1. When the device has been connected (YES at S1), model information is acquired from the device (S2). Model information is information representing a device type (such as a printing apparatus, a scanner or a digital camera) and its model. In this embodiment, model information means model codes such as "PT-2700" and "PT-9500PC". Even when the printing apparatus 1 is physically connected to the personal computer 2 by means of the USB cable 10, if the power supply of the printing apparatus 1 has not been turned on, the personal computer 2 cannot recognize the connection of the printing apparatus 1. For this reason, when the power supply of the printing apparatus 1 has also been turned on in a state in which the printing apparatus 1 has been connected to the personal computer 2 by means of the USB cable 10 but the power supply is OFF, a determination is made that the printing apparatus 1 has been newly connected.

A determination is made on the basis of the model information indicating whether or not the connected device is a device corresponding to the editing program (in this embodiment, the printing apparatus) (S3). When the connected device does not correspond to the printing apparatus (NO at S3), since the editing program does not need to be actuated, the procedure returns directly to S1.

On the other hand, when the connected device does correspond to the printing apparatus (YES at S3), the editing program is actuated, and, in order to determine whether or not the new layout-editing screen corresponding to the connected printing apparatus can be created (S4), a determination is made as to whether or not the new layout-creating flag is ON. When the new layout-creating flag is not ON (NO at S4), the editing program does not need to be actuated, and thus the procedure returns directly to S1.

On the other hand, when the new layout-creating flag is ON (YES at S4), a determination is made as to whether or not the editing program is already being executed and the application for editing the print data is being actuated (S5). When the editing program is being executed as a task of the personal computer 2 (YES at S5), the application does not need to be actuated once again, and thus the procedure returns directly to S1. When the application is not being actuated (NO at S5), the editing program is actuated (S6), and the procedure returns to S1.

Figure 10:
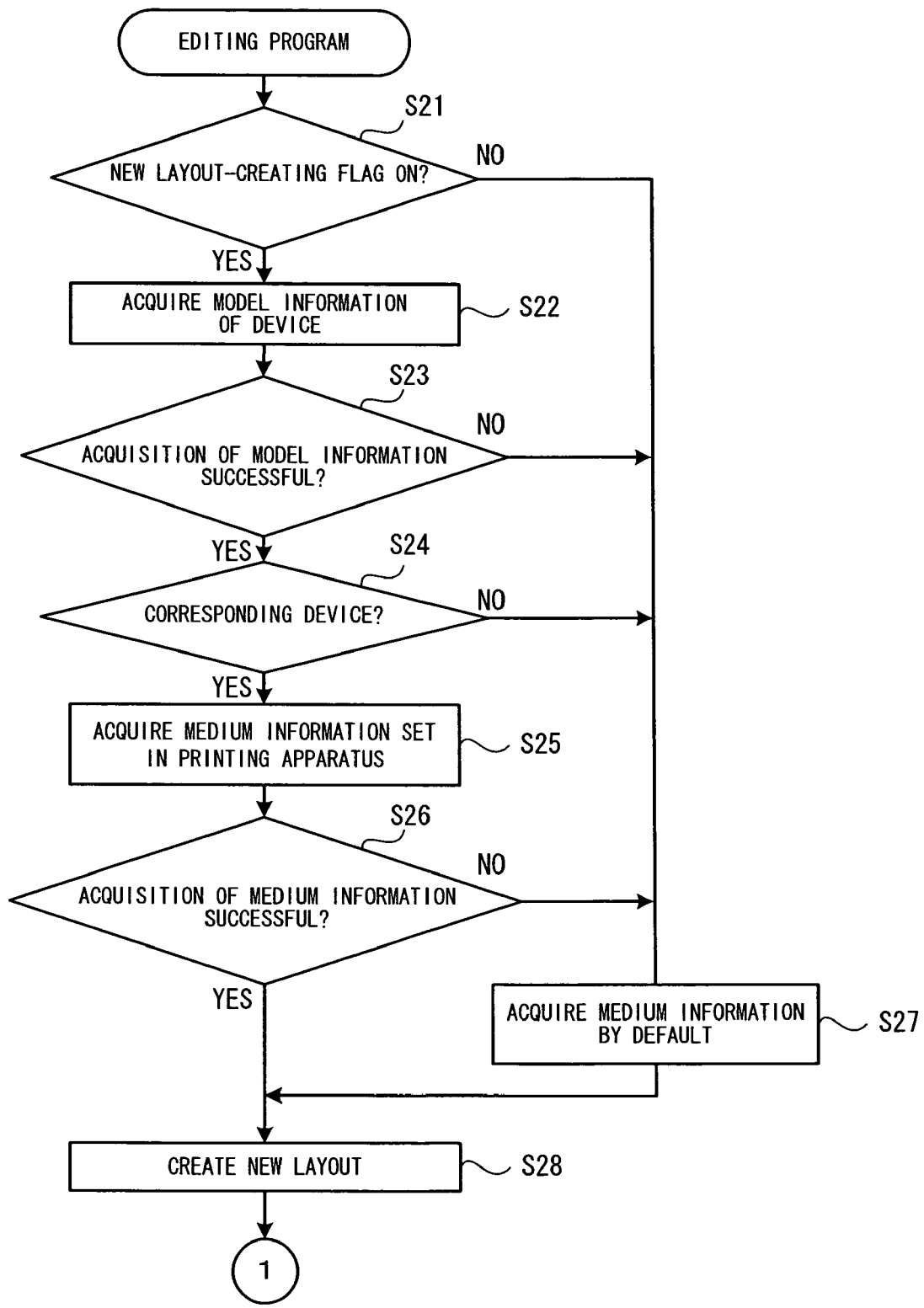
FIG. 10 is a flowchart of an editing program.

The procedure for the editing program will now be explained with reference to the flowcharts in FIGS. 10 and 11. The editing program is started by an operation of a user, or by means of the connecting program, and is for purposes of editing for printing an object, or for purposes of executing printing in the printing apparatus 1. However, the procedure is the main portion of the disclosure for displaying the new layout-editing screen by means of the connection of the printing apparatus 1, or by means of the replacement of a medium, and will now be explained in detail.

First of all, when the editing program is executed, a determination is made as to whether or not the new layout-creating flag is ON (S21). When the new layout-creating flag is not ON (NO at S21), the printing apparatus and the medium stored that have been default in the program-related information storage area 62 are read so as to be a selected medium. The printing apparatus and the medium are respectively stored in a printing apparatus information storage area 5232 and a medium information storage area 5233 of the first layout information storage area 523 in the RAM 52 (S27). In circumstances where the medium specified by the medium information stored in the medium information storage area 5233 is arranged in a specified direction, the layout image is composed of only a sheet image. The editor 100, on which the new layout-editing screen is displayed, is displayed on the monitor 31 (S28). At this time, the layout image is displayed on the new layout-editing screen. The procedure then proceeds to S31 in FIG. 11.

When the new layout-creating flag is ON (YES at S21), the model information of the device connected to the USB interface 70 is acquired (S22). More specifically, a model information-acquiring request signal for purposes of requesting acquisition of model information is transmitted to the device, and in response the device returns model information. For this reason, model information is received and is stored in the printing apparatus information storage area 5232 of the first layout information storage area 523 in the RAM 52. At this time, in cases where acquisition of model information has not proved successful, because the device is not connected to the USB interface 70, or the device does not return the model information (NO at S23), the procedure then proceeds to S27. Medium information about the medium that has been selected by default is read from the program-related information storage area 62 (S27), and the editor, on which the new layout-editing screen of the medium information is displayed, is displayed (S28). The procedure proceeds to S31 in FIG. 11.

When the device has been connected to the USB interface 70 and model information can be acquired (YES at S23), a determination is made as to whether or not the connected device is a device corresponding to the editing program (in this embodiment, the printing apparatus) (S24). When the connected device is not the printing apparatus (NO at S24), the device is not related to this program, and thus the procedure proceeds to S27. Medium information about the medium that has been selected by default is read from the program-related information storage area 62 (S27), and the editor 100, on which the new layout-editing screen of the medium information is displayed, is displayed (S28). The procedure then proceeds to S31 in FIG. 11.

When the connected device is the printing apparatus (YES at S24), medium information on the medium set in the printing apparatus is acquired from the printing apparatus (S25). More specifically, a medium information-acquiring request signal for purposes of requesting acquisition of medium information is transmitted to the printing apparatus, and the printing apparatus accordingly returns the medium information to the personal computer 2. The medium information thus returned is received, and is stored in the medium information storage area 5233 of the first layout information storage area 523 in the RAM 52. When acquisition of medium information has been successful (YES at S26), a new layout image is composed of only a sheet image which is based on the model information of the printing apparatus 1 stored in the first layout information storage area 523, and which was acquired at S22, and on the medium information acquired at S25. The editor 100, on which the new layout-editing screen with the new layout image is displayed, is displayed on the monitor 31 (S28). When acquisition of medium information has not been successful (NO at S26), medium information about the medium that has been selected by default is read from the program-related information storage area 62 (S27), and the editor, on which the new layout-editing screen of the medium information is displayed, is displayed (S28). The procedure then proceeds to S31 in FIG. 11.

When the editing program is executed in such a manner, the new layout-editing screen is displayed on the basis of the state of the new layout creating flag and the state of the device connected to the USB interface 70. By means of steps S31 to S40 in FIG. 11, procedures that conform to the input of a user can be executed.

A determination is made as to whether or not instructions have been given for the new layout-creating flag setting (S31).

When the "tool" menu of the menu bar 101 has been selected and "set the new layout creating flag" has been selected from the menu displayed, a determination is made that instructions have been given (YES at S31), and the new layout-creating flag-setting screen 109 is displayed on the monitor 31 (S32). Input into the new layout-creating flag-setting screen 109 is accepted (S33), and the results of such input are stored in the new layout-creating flag storage area 64 of the HDD 60 (S34). The new layout-creating flag-setting screen is deleted (S35), and the procedure proceeds to S51.

When instructions have not been given for the new layout-creating flag-setting (NO at S31) and instructions have been given for the editing of the object (YES at S36) an editing procedure appropriate to this is executed (S38). More specifically, the editing procedure includes procedures such as the addition of objects, the deletion of objects, changes in the sizes of objects, changes of object attribution and, character input. The procedure proceeds to S51. Further, when instructions have not been given for the editing of objects (NO at S36) and instructions have been given for printing (YES at S37), the layout is printed (S39). Instructions for printing are given by means of selecting the printing button 1214 of the printing apparatus tool box 121, or by means of selecting "print" from the menu displayed, by selection of the "file" menu on the menu bar. The procedure then returns to S51. When instructions have not been given for printing (NO at S37), another procedure is executed (S40), and the procedure proceeds to S51.

When a procedure is executed in such a manner according to the instructions of a user, in cases where in steps S51 to 60 the new layout-creating flag is ON, the condition of the device connected to the USB interface 70 is checked. Further, in cases where a new printing apparatus 1 has been connected, or the medium set in the printing apparatus 1 has been changed, a layout-editing screen is displayed in which a new layout image is displayed in the task area 150.

A determination is first made as to whether or not the new layout-creating flag is ON (S51). When the new layout flag is not ON (NO at S51), the new layout-editing screen does not need to be displayed, and thus the procedure returns directly to S31 so that a procedure corresponding to an input by a user can be executed (S31 to S40).

On the other hand, when the new layout-creating flag is ON (YES at S51), model information relating to the device connected to the USB interface 70 is acquired (S52). More specifically, a model information acquisition request signal for requesting acquisition of model information is transmitted to the device, and the device accordingly returns the model information. For this reason, model information is received and is stored in the connected printing apparatus storage area 521 of the RAM 52. At this time, when acquisition of model information has not proved successful, because the device has not been connected to the USB interface 70, or the device does not return the model information (NO at S53), the procedure returns to S31, and a procedure corresponding to an input by a user is executed (S31 to S40).

When the device has been connected to the USB interface 70 and model information can be acquired (YES at S53), a determination is made as to whether or not the connected device is the device corresponding to the editing program (in this embodiment, the printing apparatus) (S54). When the connected device does not correspond to the printing apparatus (NO at S54), the device is not related to this program, and thus the procedure returns to the S31 so that a procedure corresponding to an input of a user can be executed (S31 to S40).

When the connected device is the printing apparatus (YES at S54), medium information on the medium that has been set in the printing apparatus is acquired from the printing apparatus (S55). More specifically, a medium information acquisition request signal for requesting acquisition of medium information is transmitted to the printing apparatus, and the printing apparatus accordingly returns the medium information to the personal computer 2. For this reason, medium information is received and is stored in the set medium information area 522 of the RAM 52.

When acquisition of medium information has been successful (YES at S56), a determination is made as to whether or not the printing apparatus has been changed (S57). Model information stored in the connected printing apparatus storage area 521 is compared with model information stored in the printing apparatus information storage area 5232 of the layout information storage area 523 of the layout-editing screen displayed at that time on the front surface. When the printing apparatus has not been changed (NO at S57), a determination is made as to whether or not the medium set in the printing apparatus has been changed (S58). The medium information stored in the set medium storage area 522 is compared with the medium information stored in the medium information storage area 5233 of the layout information storage area 523 of the layout-editing screen displayed at the time on the front surface. When the medium has not been changed (NO at S58), the printing apparatus and the medium are not changed, and thus the procedure returns to S31 so that a procedure corresponding to an input of a user can be executed (S31 to S40).

Figure 12:
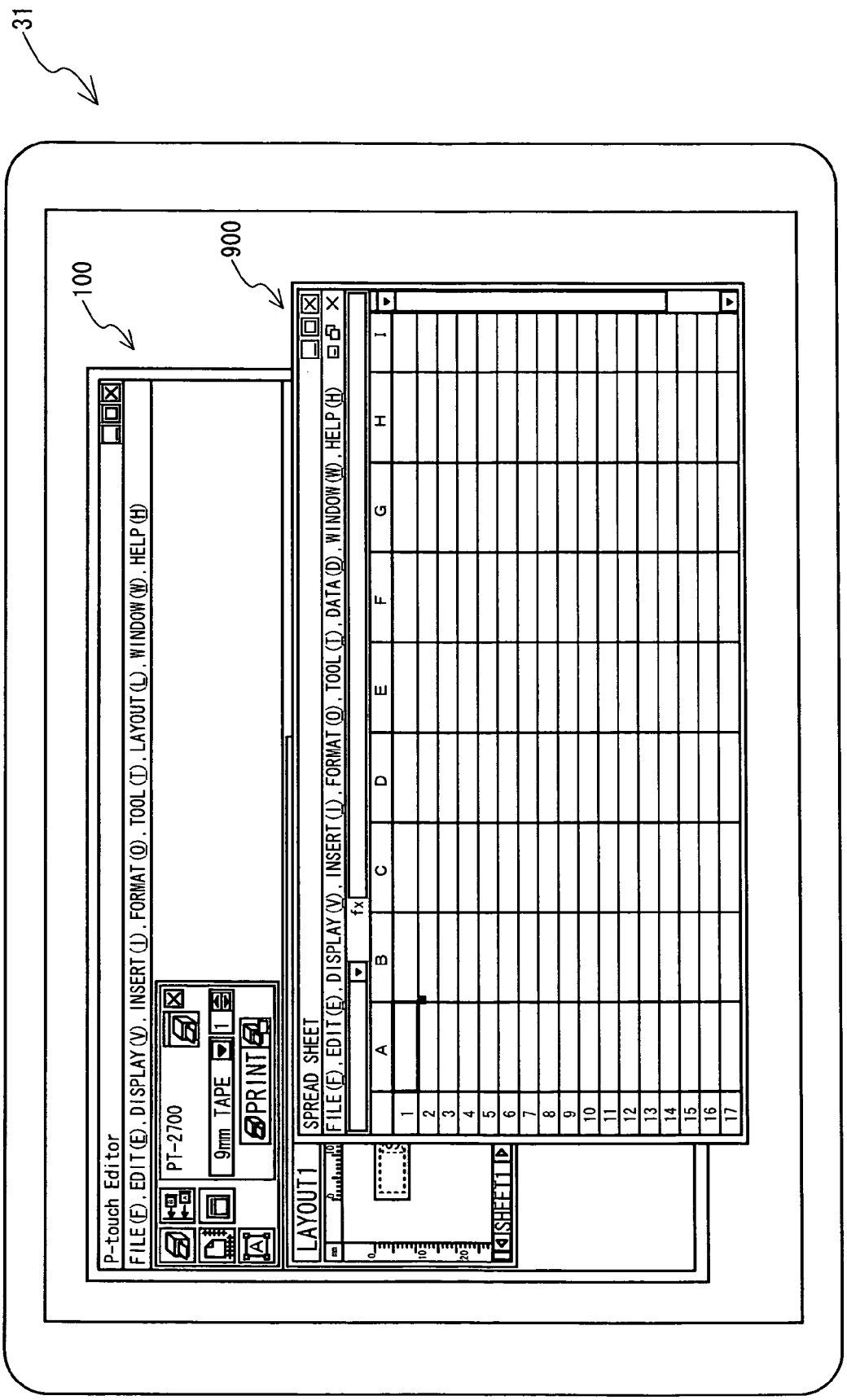
FIG. 12 is an image diagram of a monitor on which an editor and a spreadsheet software window have been displayed.
Figure 13:
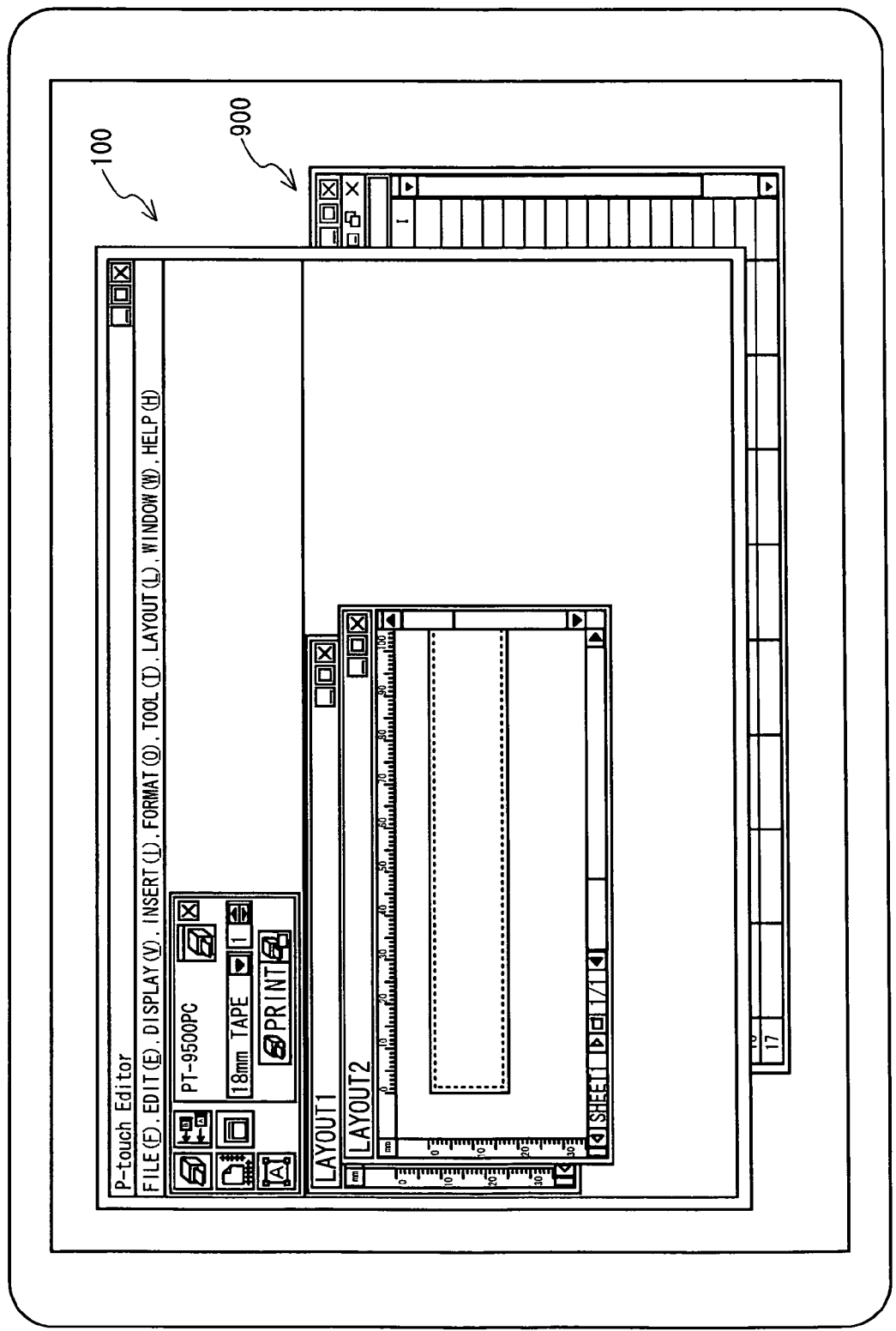
FIG. 13 is an image diagram of a monitor on which an editor and a spreadsheet software window have been displayed.

When the printing apparatus has changed (YES at S57), or the medium has changed (YES at S58), a layout-editing screen corresponding to the printing apparatus and to the medium stored in the connected printing apparatus storage area 521 and the set medium storage area 522 is newly displayed (S59). More specifically, a new layout information storage area is created in the RAM 52. Model information stored in the connected printing apparatus storage area 521 is stored in the printing apparatus information storage area, and medium information stored in the set medium storage area 522 is stored in the medium information storage area. An identification code in an identification information storage area of the layout information storage area created is stored in the selected screen information storage area, and the new layout-editing screen is arranged on the front surface. The new layout-editing screen, on which a new layout image that is composed of only a sheet image is displayed on the basis of information in the layout information storage area, is displayed on the front surface of the editor 100 displayed on the monitor 31 (S59). The editor 100 is displayed on the front surface of the window displayed on the monitor 31 (S60). More specifically, in the OS, the window (active window) to which an input from the keyboard 41 is allocated is deemed to be the editor 100. For example, as illustrated in FIG. 12, even when a window 900 of a spreadsheet software is displayed on the surface in front of the editor 100, as illustrated in FIG. 13, the editor 100 is displayed on the surface in front of the window 900 of the spreadsheet software.

When the editing program has been started in such a manner by means of the connecting program, or by an operation of a user, if the new layout-creating flag is ON, a layout-editing screen appropriate to the printing apparatus 1 thus connected is displayed. In cases where a new printing apparatus 1 has been connected, or a medium has been replaced while the editing program is being executed, a layout-editing screen is displayed on which a new layout image corresponding to the new printing apparatus 1, is displayed, or a layout-editing screen is displayed on which a new layout image corresponding to the new medium is displayed.

When, therefore, the printing apparatus 1 has been connected, an editing program is automatically actuated, and a layout-editing screen is displayed on which a layout image corresponding to the printing apparatus 1 is displayed. For this reason, a user does not need to actuate an editing program deliberately. Since a layout-editing screen corresponding to medium set in the printing apparatus 1 to be used is displayed, editing of the object can be started at once, and the burdensome tasks of actuating the editing program, of setting the printing apparatus and of setting the medium can be dispensed with. Further, when the printing apparatus has been replaced, a layout-editing screen is displayed on which a layout image corresponding to the new printing apparatus is displayed. Therefore, since a layout-editing screen corresponding to the medium set in the printing apparatus 1 to be used is displayed, a user can start editing of an object at once, and thus the burdensome tasks of setting the printing apparatus and setting the medium can be dispensed with. Even when the printing apparatus 1 is physically connected to the personal computer 2 by means of the USB cable 10, if the power supply of the printing apparatus 1 is not ON, the personal computer 2 cannot recognize a connection of the printing apparatus 1. As a result, when also the power supply of the printing apparatus 1 is turned ON from a state in which the printing apparatus 1 has been connected to the personal computer 2 by means of the USB cable 10, but the power supply is OFF, a determination can be made that the printing apparatus 1 has been newly connected.

When the medium has been replaced, a layout-editing screen on which the layout image of the new medium is displayed is displayed automatically. For this reason, a user does not have to set the medium deliberately, and thus the burdensome task of setting the medium can be dispensed with.

When these functions are not necessary, setting of the new layout-creating flag can be eliminated, and a new layout-editing screen need not be displayed. As a result, a new layout-editing screen can be set to be displayed, or otherwise, according to the preference of a user, and this can be regarded as an advantage.

The print data-editing apparatus and the print data-editing program are not limited to the above embodiment, and they may be changed in a variety of ways without departing from the gist of the disclosure. In the above embodiment, the printing apparatus that executes the printing on a tape is exemplified as the printing apparatus 1, and the tape is exemplified as the medium on which the printing is executed. However, it goes without saying that the print medium may be a cut sheet, a continuous sheet, or a tape to which a die cut seal is stuck, and the printing apparatus 1 may be an item of equipment such as a laser printer, an ink-jet printer, a thermal-transfer printer or a dot printer, an item of equipment that executes printing on other types of medium.

In the above embodiment, in the editing program, when the new layout-creating flag is ON at a timing after the procedures corresponding to the input of a user between steps S31 and S40 have been executed, model information and medium information are acquired. However, the timing of the procedure need not be limited to this, and the procedures between S51 and S60 may be executed for regular periods of time (for example periods of 1 minute). Further, in the connecting program, the device connected to the USB interface 70 is monitored and model information and medium information can be acquired at predetermined timings (for example, every one minute, constantly repeated). When it has proved possible to acquire model information and medium information, it can be interrupted to the editing program and delivered the model information and medium information. In the editing program, the model information and the medium information received can be compared with the printing apparatus information and the medium information on the selected layout-editing screen, and when they do not match, the new layout-editing screen may be displayed. Further, when it proves possible to acquire model information and medium information by means of the connecting program, the printing apparatus information and the medium information on the selected layout-editing screen can be acquired in the connecting program, and instructions to create the new layout-editing screen in the editing program need be given only when the printing apparatus information and the medium information have been compared and do not match.

Further, in the above embodiment, the new layout-creating flag is set in advance, but such a flag need not used, and the new layout-editing screen can invariably be displayed. In such a case, before the new layout-editing screen is displayed, confirmation screen can be appropriately displayed. Such a confirmation screen can be used to display messages, such as; "The printing apparatus has been connected. Does a new layout-editing screen need to be created?"; "The printing apparatus has been replaced. Does a new layout-editing screen need to be created?"; and "The medium has been replaced. Does a new layout-editing screen need to be created?", and an OK button and a cancel button can be provided. Only when the OK button has been selected, the new layout-editing screen can be displayed.

In the print data-editing apparatus of the disclosure, a connecting device connects the printing apparatus, and a connection-detecting device detects that the printing apparatus has been connected to the connecting device. A printing apparatus type acquiring device acquires from the printing apparatus the type of printing apparatus connected to the connecting device, and a display device displays information. A layout image display device displays on the display device a layout image in which the object to be printed is arranged on an image of the print medium, and, when the connection-detecting device has detected that the printing apparatus has been connected to the connecting device, a new layout image-creating device can newly display on the layout image display device a printable layout image of the print medium in the printing apparatus of the type acquired by the printing apparatus type-acquiring device. Therefore, the printing apparatus used need not to be selected by a user, editing can be started at once by use of a layout image printable in the printing apparatus connected, and thus the burden of tasks required to be performed for purposes of printing the print data can be reduced.

In the print data-editing apparatus of the disclosure, a print medium type-acquiring device can acquire from the printing apparatus the type of print medium set in the printing apparatus connected to the connecting device. A new layout image-creating device can create a layout image of the print medium of the type acquired by the print medium type-acquiring device. Therefore, the type of print medium does not need to be selected by a user, and editing can be started at once by use of a layout image of the print medium set in the printing apparatus connected, and thus the burden of tasks required to be performed for the purposes of printing the print data can be reduced.

In the print data-editing apparatus of the disclosure, a creating instruction request device requests instructions for determining whether or not a layout image needs to be created by the new layout image-creating device when the connection-detecting device has detected that the printing apparatus has been connected to the connecting device, and a new creating instruction input device inputs instructions for determining whether or not a layout image needs to be created by the new layout image-creating device in accordance with the request made by the creating instruction request device. A new layout image creation control device can enable the new layout image-creating device to create a layout image only when a creating instruction has been input by the new creating instruction device. Therefore, a layout image can be newly created according to the printing apparatus connected only when a user so desires. For this reason, when a layout image corresponding to the printing apparatus connected does not need to be newly created, creation thereof can be dispensed with.

In the print data-editing apparatus of the disclosure, a print medium type storage device stores therein the type of print medium acquired by the print medium type-acquiring device, and a print medium information acquisition control device can enable the print medium type-acquiring device to acquire at a predetermined timing the type of print medium set in the printing apparatus connected to the connecting device. When the print medium type-acquiring device acquires the type of print medium by means of control by the print medium information acquisition control device, if a type of print medium is acquired that is different from the type of the print medium stored in the print medium type storage device, the new layout image-creating device can newly display on the layout image display device the layout image of the print medium type acquired. Therefore, when the type of print medium in the printing apparatus has been changed, a layout image of the new print medium type can be created, and thus also when a user replaces a print medium with a new one, the burden of tasks required to be performed for purposes of printing the print data can be reduced.

In the print data-editing apparatus of the disclosure, a new layout image display control device can display on the front surface of the display device the layout image created by the new layout image-creating device. Therefore, a user can easily recognize that the layout image has been newly created.

In the print data-editing apparatus of the disclosure, the connecting device connects the printing apparatus, the display device displays information, and the layout image display device displays on the display device the layout image in which the object to be printed is arranged on the image of the print medium. A control device detects that the printing apparatus has been connected to the connecting device, and acquires from the printing apparatus the type of printing apparatus connected to the connecting device. When the connection-detecting device detects that the printing apparatus has been connected to the connecting device, in the printing apparatus of the type acquired a printable layout image of the print medium can be newly displayed on the layout image display device by the control device. Therefore, a user does not need to select the printing apparatus to be used, editing can be started at once by use of the layout image printable in the connected printing apparatus, and the burden of tasks required to be performed for purposes of printing the print data can be reduced.

In the print data-editing apparatus of the disclosure, the control device can further acquire from the printing apparatus the type of print medium set in the printing apparatus connected to the connecting device, and can furthermore create a layout image of the print medium of the type acquired. Therefore, a user does not need to select deliberately the type of print medium, editing can be started at once by use of the layout image of the print medium set in the printing apparatus connected, and the burden of tasks required to be performed for purposes of printing the print data can be reduced.

In the print data-editing apparatus of the disclosure, when the control device detects that the printing apparatus has been connected to the connecting device, the creating instruction request device requests instructions for determining whether or not a layout image needs to be created by the control device. In response to the request from the creating instruction request device, the new creating instruction input device inputs instructions for determining whether or not a layout image needs to be created by the control device and only when the creating instruction has been input by the new creating instruction input device does the control device create the layout image. Therefore, only when a user so desires, need a layout image be newly created that corresponds to the printing apparatus connected. For this reason, when a layout image corresponding to the printing apparatus connected does not need to be newly created, creation thereof can be eliminated.

In the print data-editing apparatus of the disclosure, the print medium type storage device stores therein the type of print medium acquired by the control device, and the control device can acquire at a predetermined timing the type of print medium set in the printing apparatus connected to the connecting device. When the control device acquires the type of print medium, if a type of print medium is acquired that is different from the type of print medium stored in the print medium type storage device, a layout image of the print medium type acquired can be newly displayed on the layout image display device. Therefore, when the type of print medium in the printing apparatus has been changed, a layout image of the new print medium type is created, and when a user replaces the print medium with a new one, the burden of tasks required to be performed for purposes of printing the print data can be reduced.

In the print data-editing apparatus of the disclosure, the new layout image display control device can further display a layout image created by the control device on the front surface of the display device. Therefore, a user can easily recognize that a layout image has been newly created.

In the print data-editing program stored in the computer readable medium of the disclosure, a connection of the printing apparatus is detected in a connection-detecting step, and the type of printing apparatus connected is acquired from the printing apparatus in a printing apparatus type-acquiring step. A layout image in which an object to be printed is arranged on the image of the print medium, is displayed in a layout image display step, and in a new layout image-creating step, when a connection of the printing apparatus has been detected during the connection-detection step, a layout image of the print medium printable in the printing apparatus of the type acquired in the printing apparatus type acquiring step can be newly displayed in a layout image display step. Therefore, a user does not need to select deliberately the printing apparatus to be used, editing can be started at once by use of the layout image printable by the connected printing apparatus, and the burden of tasks required to be performed for purposes of printing the print data can be reduced.

In the print data-editing program of the disclosure, the type of print medium set in the printing apparatus that has been connected can be acquired from the printing apparatus in a print medium type-acquiring step. Further, a layout image of the print medium of the type acquired in the print medium type-acquiring step can be created in a new layout image-creating step. Therefore, a user does not need to select deliberately the type of print medium, editing can be started at once by use of the layout image of the print medium set in the printing apparatus connected, and the burden of tasks required for purposes of printing the print data can be reduced.

In the print data-editing program of the disclosure, when a connection of the printing apparatus has been detected in the connection-detecting step, instructions for determining whether or not the layout image needs to be created in a new layout image-creating step are requested in a creating instruction request step, and in response to the request in the creating instruction request step instructions for determining whether or not a layout image needs to be created in a new layout image creating step is input in a new creating instruction input step. In a new layout image creation control step, a layout image can be created by means of the new layout image-creating step only after instructions of creation have been input in the new creation instruction step. Therefore, a layout image can be newly created according to the printing apparatus connected only when a user so desires. For this reason, when a layout image according to the printing apparatus connected does not need to be newly created, creation thereof can be dispensed with.

In the print data-editing program of the disclosure, the type of print medium acquired in the print medium type-acquiring step is stored in a print medium type-storing step, and, in a print medium information acquisition control step, the type of print medium set in the printing apparatus connected can be acquired at a predetermined timing by means of a print medium type-acquiring step. When, in the print medium type acquiring step, the type of print medium is acquired by means of control in the print medium information acquisition control step, if the type of print medium is different from the type of print medium stored at the print medium type storing step, a layout image of the type of print medium acquired in the new layout image-creating step can be newly displayed in a layout image display step. Therefore, when the print medium type of the printing apparatus has been changed, a layout image of the new print medium type is created. For this reason, when a user replaces the print medium with a new one, the burden of tasks required to be performed for purposes of printing the print data can be reduced.

In the print data-editing program of the disclosure, a layout image created in the new layout image-creating step can be displayed on the front surface in a new layout image display control step. Therefore, a user can easily recognize that the layout image has been newly created.

In the print data-editing program of the disclosure, in the connecting program a connection-detecting step can at least be executed. In the editing program at least various procedural steps can be executed, excluding the connection-detecting step. When a connection of the printing apparatus has been detected in the connection-detecting step, the editing program can be actuated by means of the connecting program.

In the illustrated embodiment, the control device (CPU 50) is preferably implemented with the use of an appropriately programmed general purpose computer, e.g., a microprocessor, a microcontroller or another processor device (CPU or MPU). It will be appreciated by those skilled in the art that the controller also can be implemented as a single special purpose integrated circuit (e.g., an ASIC) having a main or central processor section for overall control, system-level control, and separate sections dedicated to performing various different specific computations, functions or other procedures under control of the central processor section. The controller can also be implemented with the use of a plurality of separate dedicated or programmable integrated or other electronic circuits or devices (e.g., hardwired electronic or logic circuits such as discrete element circuits, or programmable logic devices such as PLDs, PLAs or PALs). The controller can also be implemented with the use of an appropriately programmed general purpose computer in conjunction with one or more peripheral (e.g., integrated circuit) data and signal processing devices. In general, any device or assembly of devices can be used as the controller of the disclosure, as long as a machine in a finite state is capable of implementing the procedures described.

What is claimed is:

1. A print data-editing apparatus editing print data to be printed with a printing apparatus, the print data-editing apparatus comprising:
   a connecting device that connects the printing apparatus;
   a display device that displays information;
   a print medium type-acquiring portion that acquires from the printing apparatus a type of print medium set in the printing apparatus connected to the connecting device;
   a connection-detecting portion that detects that the printing apparatus has been connected to the connecting device;
   a printing apparatus type-acquiring portion that acquires from the printing apparatus a type of printing apparatus connected to the connecting device;
   a layout image display portion that displays on the display device a layout-editing screen including a layout image in which an object to be printed is arranged on an image of a print medium,
   the layout image display portion includes a display area and displays a layout-editing screen within the display area;
   a new layout image-creating portion that,
   when the connection-detecting portion has detected that the printing apparatus has been connected to the connecting device,
   newly displays on the layout image display portion a layout image of the print medium of the type acquired by the printing medium type-acquiring portion that is among print mediums printable in the printing apparatus of the type acquired by the printing apparatus type-acquiring portion, and
   the new layout image-creating portion that,
   when the connection-detecting portion has detected that the printing apparatus connected to the connecting device has been changed, displays on the previously displayed layout-editing screen including the layout image in the layout image display portion a layout-editing screen including the layout image of the print medium of the type acquired by the print medium type-acquiring portion that is among print mediums printable in a changed printing apparatus of the type acquired by the printing apparatus type-acquiring portion; and
   when it has been detected that the printing medium in the detected apparatus connected to the connecting device has been changed, displays on the previously displayed layout-editing screen including the layout image in the layout image display portion a layout-editing screen including the layout image of the changed print medium of the acquired type that is among printable print mediums;
   a print medium type storage device that stores the type of print medium acquired by the print medium type-acquiring portion,
   a print medium information acquisition control portion that acquires at a predetermined timing, by means of the print medium type-acquiring portion, the type of print medium set in the printing apparatus connected to the connecting device,
   wherein, when the type of print medium acquired by the print medium type-acquiring portion by means of control by the print medium information acquisition control portion is of a type of print medium that is different from the type of print medium stored in the print medium type storage device,
   the new layout image-creating portion newly displays on the layout image display portion a layout image of the print medium type acquired,
   the print data-editing apparatus further comprising:
   a creating instructions request portion that,
   when the connection-detecting portion has detected
      that a new printing apparatus has been connected to the connecting device, or
      that the printing apparatus connected to the connecting device has been changed,
   requests instructions for determining whether a layout image needs to be created by the new layout image-creating portion,
   whereby the print data-editing apparatus provides a user with an option of selecting whether to create a new layout image upon detecting that the new printing apparatus has been connected, or the printing apparatus has been changed;
   a new creating instructions input portion that inputs the instructions for determining whether, in accordance with the request made by the creating instructions request portion, a layout image needs to be created by the new layout image-creating portion; and
   a new layout image creation control portion that enables the new layout image-creating portion to create a layout image only after the creating instructions have been input by the new creating instructions input portion,
   wherein the print data-editing apparatus provides a user with an option of selecting whether to create a new layout image upon detecting a print medium change.

2. A print data-editing apparatus editing print data to be printed with a printing apparatus, the print data-editing apparatus comprising:
   a connecting device that connects the printing apparatus;
   a display device that displays information;
   a program storing device that stores an application into which an editing program is incorporated;
   a controller that, by executing the application into which an editing program is incorporated:
   acquires from the printing apparatus a type of print medium set in the printing apparatus connected to the connecting device,
   detects that the printing apparatus has been connected to the connecting device,
   acquires from the printing apparatus a type of printing apparatus connected to the connecting device,
      displays on the display device a layout-editing screen including a layout image in which an object to be printed is arranged on an image of a print medium,
   displays a layout-editing screen within a display area, the display area is included in a layout image display portion,
      when it has been detected that the printing apparatus has been connected to the connecting device,
      newly displays on the layout image display portion a layout image of the print medium of the acquired type by the printing medium type-acquiring portion that is among print mediums printable in the printing apparatus of the acquired type without actuating the application into which an editing program is incorporated once again, when it has been detected that the printing apparatus connected to the connecting device has been changed, displays on the previously displayed layout-editing screen including the layout image in the layout image display portion a layout-editing screen including the layout image of the print medium of the acquired type that is among print mediums printable in a changed printing apparatus of the acquired type without actuating the application into which an editing program is incorporated once again, when it has been detected that the printing medium in the detected printing apparatus connected to the connecting device has been changed, displays on the previously displayed layout-editing screen including the layout image in the layout image display portion a layout-editing screen including the layout image of the changed print medium of the acquired type that is among printable print mediums without actuating the application into which an editing program is incorporated once again, acquires at a predetermined timing, the type of print medium set in the printing apparatus connected to the connecting device, when the type of acquired print medium is of an acquired type of print medium that is different from the type of print medium stored in the print medium type storage portion, newly displays on the layout image display portion a layout image of the print medium type acquired, requests instructions for determining whether a layout image needs to be created, when it has been detected that
  a new printing apparatus has been connected to the connecting device, or
  the printing apparatus connected to the connecting device has been changed,
whereby the print data-editing apparatus provides a user with an option of selecting whether to create a new layout image upon detecting that the new printing apparatus has been connected, or the printing apparatus has been changed, inputs the instructions for determining whether, in accordance with the request, a layout image needs to be created; and enables to create a layout image only after the creating instructions have been input, a print medium type storage device that stores the acquired type of print medium, wherein the print data-editing apparatus provides a user with an option of selecting whether to create a new layout image upon detecting a print medium change.

3. A print data-editing program stored in a non-transitory computer readable medium comprising the steps of:

a print medium type-acquiring step of acquiring from a printing apparatus a type of print medium set in the printing apparatus connected to a connecting device;

a connection-detecting step of detecting that the printing apparatus has been connected to the connecting device;

a printing apparatus type-acquiring step of acquiring from the printing apparatus a type of printing apparatus connected to the connecting device;

a layout image display step of displaying on a display device a layout-editing screen including a layout image in which an object to be printed is arranged on an image of a print medium, the layout image display step includes displaying a layout-editing screen within a display area;

a new layout image-creating step that, when the connection-detecting step has detected that the printing apparatus has been connected to the connecting device, performs the step of:

newly displaying in the layout image display step a layout image of the print medium of the type acquired by the printing medium type-acquiring step that is among print mediums printable in the printing apparatus of the type acquired by the printing apparatus type-acquiring step, and the new layout image-creating step that, when the connection-detecting step has detected that the printing apparatus connected to the connecting device has been changed, performs the step of:

displaying on the previously displayed layout-editing screen including the layout image displayed in the layout image display step a layout-editing screen including the layout image of the print medium of the type acquired by the print medium type-acquiring step that is among print mediums printable in a changed printing apparatus of the type acquired by the printing apparatus type-acquiring step; and when it has been detected that the printing medium in the detected apparatus connected to the connecting device has been changed, performs the step of:

displaying on the previously displayed layout-editing screen including the layout image displayed in the layout image display step a layout-editing screen including the layout image of the changed print medium of the acquired type that is among printable print mediums;

a print medium type storage step of storing the type of print medium acquired by the print medium type-acquiring step, a print medium information acquisition control step of acquiring at a predetermined timing, by means of the print medium type-acquiring step, the type of print medium set in the printing apparatus connected to the connecting device, wherein, when the type of print medium acquired by the print medium type-acquiring step by means of control by the print medium information acquisition control step is of a type of print medium that is different from the type of print medium stored in the print medium type storage step, the new layout image-creating step performs the step of newly displaying in the layout image display step a layout image of the print medium type acquired, the print data-editing apparatus further comprising:

a creating instructions request step that, when the connection-detecting step has detected
  that a new printing apparatus has been connected to the connecting device, or
  that the printing apparatus connected to the connecting device has been changed, requests instructions for determining whether a layout image needs to be created by the new layout image-creating step, whereby the print data-editing apparatus provides a user with an option of selecting whether to create a new layout image upon detecting that the new printing apparatus has been connected, or the printing apparatus has been changed;

a new creating instructions input step that inputs the instructions for determining whether, in accordance with the request made by the creating instructions request step, a layout image needs to be created by the new layout image-creating step; and a new layout image creation control step of enabling the new layout image-creating step to create a layout image only after the creating instructions have been input by the new creating instructions input step, wherein the print data-editing apparatus provides a user with an option of selecting whether to create a new layout image upon detecting a print medium change.

4. The print data-editing program according to claim 3, further comprising:

a connecting program that executes at least the connection detecting step; and an editing program that executes at least various procedural steps excluding the connection-detecting step, wherein the connecting program has an actuating function that actuates the editing program when the connection of the printing apparatus has been detected in the connection-detecting step.

5. A print data-editing program stored in a non-transitory computer readable medium comprising the steps of:

acquiring from a printing apparatus a type of print medium set in the printing apparatus connected to a connecting device, detecting that the printing apparatus has been connected to the connecting device, acquiring from the printing apparatus a type of printing apparatus connected to the connecting device, displaying on a display device a layout-editing screen including a layout image in which an object to be printed is arranged on an image of a print medium, displaying a layout-editing screen within a display area, the display area is displayed in a layout image display step, when it has been detected that the printing apparatus has been connected to the connecting device, performs the step of:

newly displaying in the layout image display step a layout image of the print medium of the acquired type by the printing medium type-acquiring step that is among print mediums printable in the printing apparatus of the acquired type without actuating an application into which an editing program is incorporated once again, when it has been detected that the printing apparatus connected to the connecting device has been changed, performs the step of:

displaying on the previously displayed layout-editing screen including the layout image displayed in the layout image display step a layout-editing screen including the layout image of the print medium of the acquired type that is among print mediums printable in a changed printing apparatus of the acquired type without actuating the application into which an editing program is incorporated once again, when it has been detected that the printing medium in the detected printing apparatus connected to the connecting device has been changed, performs the step of:

displaying on the previously displayed layout-editing screen including the layout image displayed in the layout image display step a layout-editing screen including the layout image of the changed print medium of the acquired type that is among printable print mediums without actuating the application into which an editing program is incorporated once again, acquiring at a predetermined timing, the type of print medium set in the printing apparatus connected to the connecting device, when the type of acquired print medium is of an acquired type of print medium that is different from the type of print medium stored in the print medium type storage step, performs the step of:

newly displaying in the layout image display step a layout image of the print medium type acquired, requesting instructions for determining whether a layout image needs to be created, when it has been detected that a new printing apparatus has been connected to the connecting device, or the printing apparatus connected to the connecting device has been changed, whereby the print data-editing apparatus provides a user with an option of selecting whether to create a new layout image upon detecting that the new printing apparatus has been connected, or the printing apparatus has been changed, inputting the instructions for determining whether, in accordance with the request, a layout image needs to be created; and enabling to create a layout image only after the creating instructions have been input, a print medium type storage step of storing the acquired type of print medium, wherein the print data-editing apparatus provides a user with an option of selecting whether to create a new layout image upon detecting a print medium change.

6. The print data-editing program according to claim 5, further comprising:

a connecting program that executes at least the connection-detecting step; and an editing program that executes at least various procedural steps excluding the connection-detecting step, wherein the connecting program has an actuating function that actuates the editing program when the connection of the printing apparatus has been detected in the connection-detecting step.

* * * * *